United States Patent
Stein et al.

(10) Patent No.: US 9,569,804 B2
(45) Date of Patent: Feb. 14, 2017

(54) SYSTEMS AND METHODS FOR ENERGY CONSUMPTION AND ENERGY DEMAND MANAGEMENT

(71) Applicant: Gridium, Inc., Menlo Park, CA (US)

(72) Inventors: Adam R. Stein, Chicago, IL (US); Thomas A. Arnold, Palo Alto, CA (US); Gregory D. Anderson, Lisle, IL (US)

(73) Assignee: GRIDIUM, INC., Menlo Park, CA (US)

( * ) Notice: Subject to any disclaimer, the term of this patent is extended or adjusted under 35 U.S.C. 154(b) by 360 days.

(21) Appl. No.: 13/830,919

(22) Filed: Mar. 14, 2013

(65) Prior Publication Data

US 2014/0058572 A1 Feb. 27, 2014

Related U.S. Application Data

(60) Provisional application No. 61/693,734, filed on Aug. 27, 2012.

(51) Int. Cl.
*G06Q 50/06* (2012.01)
*H02J 13/00* (2006.01)
*H02J 3/00* (2006.01)

(52) U.S. Cl.
CPC ........... *G06Q 50/06* (2013.01); *H02J 13/0017* (2013.01); *H02J 13/0079* (2013.01); *H02J 2003/003* (2013.01)

(58) Field of Classification Search
CPC ........ G01D 4/00; G06Q 50/06; H02J 13/0017; H02J 2003/003
USPC ........................................................ 700/291
See application file for complete search history.

(56) References Cited

U.S. PATENT DOCUMENTS

| | | | | |
|---|---|---|---|---|
| 8,560,134 B1 * | 10/2013 | Lee | ............................... | 700/291 |
| 8,755,943 B2 * | 6/2014 | Wenzel | ......................... | 700/276 |
| 8,843,238 B2 * | 9/2014 | Wenzel et al. | ................ | 700/277 |
| 8,849,737 B1 * | 9/2014 | Engler | ..................... | G06N 5/02 |
| | | | | 706/13 |

(Continued)

FOREIGN PATENT DOCUMENTS

| | | | |
|---|---|---|---|
| JP | 2001336805 A | 12/2001 | |
| JP | 2007133468 A | 5/2007 | |

(Continued)

OTHER PUBLICATIONS

Efficiency Valuation Organization (EVO), International Performance Measurement and Verification Protocol, Jan. 2012, pp. 24-25.*

(Continued)

*Primary Examiner* — Kenneth M Lo
*Assistant Examiner* — Michael J Huntley
(74) *Attorney, Agent, or Firm* — Perkins Coie LLP

(57) ABSTRACT

Various of the disclosed embodiments contemplate a computer-implemented method of energy consumption and energy demand management in a building. In accordance with some embodiments, interval energy data of a specific building may be collected with a fixed time interval and paired with local historical weather data and other forms of operational data, as well as financial data including historical utility bills, utility rate structures and billing cycle dates. Paired energy interval data and the local historical weather data may be analyzed according to one or more analytic algorithms.

20 Claims, 34 Drawing Sheets
(3 of 34 Drawing Sheet(s) Filed in Color)

(56) References Cited

U.S. PATENT DOCUMENTS

| | | | |
|---|---|---|---|
| 2006/0276938 A1* | 12/2006 | Miller | 700/295 |
| 2009/0012654 A1* | 1/2009 | Culp et al. | 700/291 |
| 2010/0076613 A1* | 3/2010 | Imes | G06Q 50/06 700/287 |
| 2010/0106342 A1 | 4/2010 | Ko et al. | |
| 2011/0035073 A1* | 2/2011 | Ozog | G06Q 10/06315 700/291 |
| 2011/0184574 A1* | 7/2011 | Le Roux et al. | 700/291 |
| 2011/0190953 A1* | 8/2011 | Park et al. | 700/291 |
| 2011/0307109 A1* | 12/2011 | Sri-Jayantha | 700/291 |
| 2012/0022700 A1* | 1/2012 | Drees et al. | 700/276 |
| 2012/0065792 A1* | 3/2012 | Yonezawa et al. | 700/291 |
| 2012/0083930 A1* | 4/2012 | Ilic et al. | 700/287 |
| 2012/0143516 A1 | 6/2012 | Mezic et al. | |
| 2012/0150359 A1* | 6/2012 | Westergaard | 700/291 |
| 2013/0134780 A1* | 5/2013 | Parsonnet | 307/25 |
| 2013/0173075 A1* | 7/2013 | Mitsumoto et al. | 700/291 |
| 2014/0114489 A1* | 4/2014 | Duff | 700/291 |

FOREIGN PATENT DOCUMENTS

| | | |
|---|---|---|
| KR | 1020100086380 A | 7/2010 |
| KR | 20110073155 A | 6/2011 |

OTHER PUBLICATIONS

International Search Report and Written Opinion mailed Oct. 18, 2013, for International Patent Application No. PCT/US2013/048357 filed Jun. 27, 2013, 12 pages.

\* cited by examiner

Pattern Data Point

> Time: 2012-12-01 08:45:00
> Pattern type: Needle spike
> Pattern presence: true
> Pattern code: severe
> Total demand: 350 kW
> Pattern demand: 150 kW

SYSTEMS AND METHODS FOR ENERGY CONSUMPTION AND ENERGY DEMAND MANAGEMENT

CROSS-REFERENCE TO RELATED APPLICATIONS

This application claims priority to the U.S. Provisional Application 61/693,734, entitled SYSTEM AND METHOD FOR ENERGY CONSUMPTION AND ENERGY DEMAND MANAGEMENT, filed on Aug. 27, 2012.

FIELD OF THE INVENTION

At least one embodiment of the present disclosure pertains to energy consumption and energy demand management, and more particularly, to reducing energy consumption and energy demand costs in buildings.

BACKGROUND

According to U.S. Environmental Protection Agency, buildings account for 36 percent of total energy use and 65 percent of electricity consumption in the United States. Hundreds of billions in energy savings may be achieved if energy consumption and energy demand of each building can be optimized.

However, energy use patterns of a specific building can be complex and may change over years. Energy use patterns of a typical building may be affected by factors such as weather, the age of the building, building equipment (e.g., air-conditioning systems, heating ventilation systems, lighting systems and windows), occupancy levels, occupancy hours, building control systems, operator or occupant behavior, the characteristics of the building roof, walls and floor, the building function, etc.

On the other hand, digital energy and non-energy information of many buildings, such as energy interval data commonly associated with smart meters, local historical weather data, operational data regarding the state of equipment such as lights, windows, and air-conditioning, occupancy data, etc. are readily available.

In consequence, the present inventors have recognized that there is value and need in providing a method for energy management by analyzing energy data in conjunction with non-energy data of a specific building and optimizing energy consumption, energy demand, and cost. Further, by performing such analysis on an ongoing basis or across a portfolio of buildings, the techniques developed can detect trends, changes, and outliers that may indicate fault conditions or opportunities for operational improvements. Finally, by combining the analytic output with detailed energy cost data and other decision procedures related to best practices in facilities operations, the techniques can be used to develop and refine a consolidated list of operational issues, each scored in terms of material relevance to the building owner.

SUMMARY

Certain embodiments contemplate a computer-implemented method comprising: collecting energy interval data associated with a building at a time interval; collecting local historical weather data associated with the building; creating a statistical model for predicting energy use as a function of weather and operational inputs, the statistical model created based on the energy interval data and upon the local historical weather data; analyzing paired energy interval data and local historical weather data according to one or more analytic algorithms, using the model; and providing one or more options to reduce energy bills of the building based on the analysis.

In some embodiments, the method further comprises collecting additional operational data, the additional operational data including at least one of occupancy, building hours, manufacturing output, and economic activity, and wherein the statistical model is created at least in part based on the additional operational data. In some embodiments, the method further comprises collecting energy financial data, the energy financial data including at least one of a tariff, historical bills, and historical bill cycle information. In some embodiments, providing one or more options to reduce energy bills of the building comprises: determining that a portion of past or forecast energy use or demand exceeds a threshold or matches a predetermined pattern; and sending an automatic alert based on the data exceeding the threshold or matching the pattern. In some embodiments, the method further comprises analyzing interactions between use charges, demand charges, special incentive programs, rate options and time-of-use effects. In some embodiments, the method further: generating one or more analysis reports based on at least the energy data and the analysis results. In some embodiments, each of the one or more analysis reports includes a link to a web site with additional charts and analytic results. In some embodiments, the method further comprises: collecting weather forecast data of the building; and generating a forecasting report based on demand and use predictions of the building. In some embodiments, the forecasting report includes an advanced warning when the period of highest energy demand of the building is likely to occur within current or future billing cycles.

Certain embodiments contemplate a system for energy consumption and energy demand management, the system comprising: one or more processors in a cloud-based platform; and instructions encoded in one or more computer readable media, wherein said instructions when executed using said one or more processors, cause the cloud-based platform to perform operations comprising: collecting energy interval data of a building with a fixed time interval; collecting local historical weather data associated with the building; creating a statistical model of building energy use based on local weather; analyzing paired energy interval data and local historical weather data according to one or more analytic algorithms; and providing one or more options to reduce energy bills of the building based on the analysis.

In some embodiments, the operations further comprise: collecting financial data of the building, the financial data including historical utility bills, utility rate structures and billing cycle dates. In some embodiments, the operations may further comprise: analyzing interactions between use charges, demand charges, special incentive programs, rate options and time-of-use effects. In some embodiments, the operations may further comprise: generating one or more analysis reports based on at least the energy data and the analysis results. In some embodiments, each of the one or more analysis reports includes a link to a web site with additional charts and analytic results. In some embodiments, the operations may further comprise: collecting weather forecast data of the building; and generating a forecasting report on demand and use predictions of the building. In some embodiments, the forecasting report includes an advanced warning when the period of highest energy demand of the building is likely to occur in the current or future billing cycles. In some embodiments, the local historical weather data is collected with the fixed time interval. In some embodiments, the fixed time interval is a 15-minute interval.

Certain embodiments contemplate a system for energy consumption and energy demand management comprising: a rate engine configured to simulate utility tariff logic; one or more processors in a cloud-based platform; and instructions encoded in one or more computer readable media, wherein said instructions when executed using said one or more processors, cause the system to perform operations comprising: collecting energy interval data of a building with a fixed time interval; collecting local historical weather data associated with the building; creating a statistical model of building energy use based on local weather; analyzing paired energy interval data and local historical weather data according to one or more analytic algorithms; and providing one or more options to reduce energy bills of the building based on the analysis and based upon utility tariff logic generated by the rate engine.

In some embodiments analyzing paired energy interval data and local historical weather data includes quantifying energy use patterns into a dollar amount in energy costs.

Certain embodiments contemplate a computer-implemented method for performing pattern recognition of building energy data, comprising: receiving building energy usage data; standardizing the data; performing high or low pass filtering of the data; characterizing mathematically the data to a higher-level description of energy use features; classifying the higher-level description as one of a plurality of pattern classes; and assigning a severity score.

Certain embodiments contemplate a computer-implemented method for performing measurement and verification of building energy data, comprising: calculating weather adjusted seasonality trends; forecast seasonality trends using time series models; fit a model to a post-project period data, the post-project period data comprising time and temperature interaction terms; and estimate program impact using a simulation technique.

BRIEF DESCRIPTION OF THE DRAWINGS

The patent or application file contains at least one drawing executed in color. Copies of this patent or patent application publication with color drawing(s) will be provided by the Office upon request and payment of the necessary fee. One or more embodiments of the present disclosure are illustrated by way of example and not limitation in the figures of the accompanying drawings, in which like references indicate similar elements.

FIG. 20 is an example structure of a pattern data point as may be implemented in certain embodiments.

DETAILED DESCRIPTION

Figure 1:
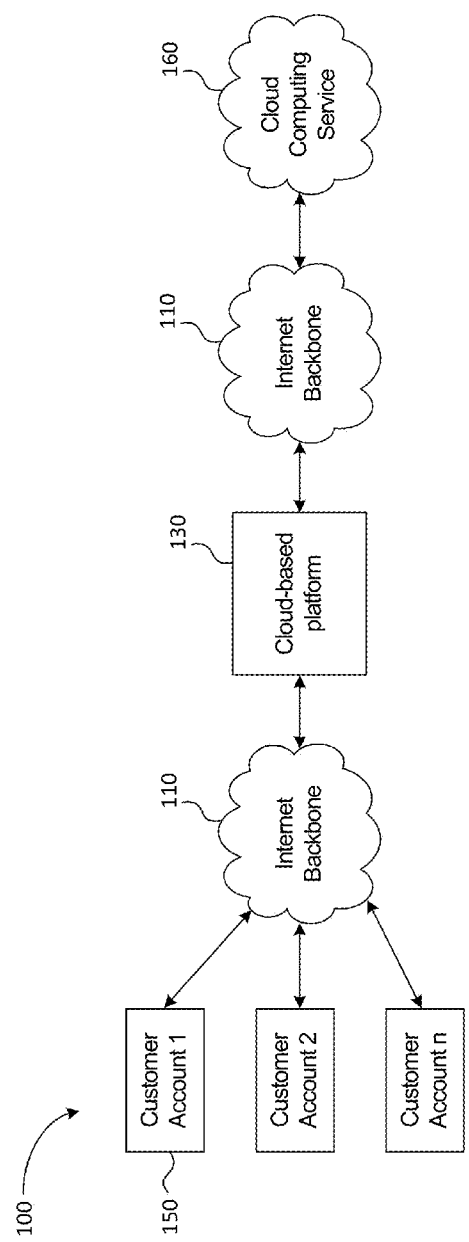
FIG. 1 illustrates an exemplary system according to one embodiment of the present disclosure.

The following description and drawings are illustrative and are not to be construed as limiting. Numerous specific details are described to provide a thorough understanding of the disclosure. However, in certain instances, well-known details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

System Overview

Various embodiments of the present disclosure include systems and methods for providing energy consumption and energy demand management. Systems and methods may be provided to automatically access interval meter data of a specific building from online sources. The interval meter data may be paired with weather information and other forms of environmental or operational data. In some embodiments, the paired data may be analyzed to identify bill reduction measures, operational problems, or potential operational improvements. In some embodiments, the analysis results may be combined with a detailed rate model that takes into account complex tariff structures. In some embodiments, reports based on the analysis results may be delivered to a specific user or a customer via email, web, and other electronic media by using a cloud-based service. Embodiments may provide methods of combining demand forecasting models and one or more load decomposition algorithms to create analytically-derived inputs for use by the rule-based and/or machine to identify building fault conditions.

FIG. 1 illustrates a schematic block diagram of a system 100 for energy consumption and energy demand management, according to one embodiment of the present disclosure. The system 100 may include a cloud-based platform 130. The cloud-based platform 130 may include one or more server computers that are coupled to Internet Backbone 110. Each server computer may have one or more IP addresses. In some implementations, the one or more server computers may be located at multiple physical locations.

In the cloud-based platform 130, each new user may be provided an option to generate a user profile. The user profile may include, by way of example, but not limitation, the user information, physical address(es) of building(s) in the user's account, etc. In some implementations, the user may be provided an option to connect the user profile to the user's existing utility web site, and/or utility web site facilitated by a third party. The cloud-based platform 130 may be configured to automatically read energy interval data of the building(s) directly from the utility web site at a fixed time interval and store the energy interval data on the platform 130. In some embodiments, the cloud-based platform 130 may be configured to automatically download local historical weather data of the building(s) with the fixed time interval or a different fixed time interval. In some implementations, the fixed time interval may be a 15-minute interval. In some implementations, the energy interval data may be read directly from electricity meters on the building(s). In some implementations, the cloud based platform 130 may make available an application programming interface that allows users to upload energy interval data and other building data at their discretion.

In some embodiments, the cloud-based platform 130 may be configured to automatically download the user's utility bills, energy rate plans, and billing cycle dates. In some embodiments, the cloud-based platform 130 may be configured to automatically download digital data of the building(s), for example, security systems that monitor the open and close status of doors and windows, badge readers that monitor changes in building occupancy over time and portions of the building(s) being occupied, $CO_2$ sensors, and controllers that monitor lighting systems in the building(s).

In some embodiments, the cloud-based platform 130 may be configured to consolidate the energy interval data with the non-energy interval data and analyze the consolidated data according to one or more analytic algorithms. In some embodiments, the energy and non-energy interval data may be analyzed by a cloud computing service 160, which is coupled to the cloud-based platform 130 via the Internet Backbone 110. As will be appreciated by those skilled in the art and as described herein, the one or more analytic algorithms may include a variety of well-known mathematical algorithms, for example, but not limited to, a General Additive Model (GAM), Random Forests (RF), Support Vector Machines (SVM), and/or non-linear regression, etc.

In some embodiments, the one or more analytic algorithms may include one or more pattern recognition algorithms. In some embodiments, the factors considered under the one or more pattern recognition algorithms may be predetermined and/or dynamically constructed or expanded using machine learning algorithms. The analytic results may be combined with detailed models of utility rate structures that allow accurate pricing information to be associated with specific energy use events or hypothetical scenarios such as the billing impact of a reduction in energy usage at a specific time of day, week, or billing cycle. In some implementations, the detailed models of utility rate may take account of complex interactions between use charges, demand charges, special incentive programs, rate options, and time-of-use effects.

In some implementations, energy data, analytic results, and rate information of a specific customer may be formatted into a series of customized reports. The system of certain embodiments may deliver series of reports on demand, according to a fixed schedule (e.g., weekly or monthly), or in response to specific events (e.g., the occurrence of an operational problem or external occurrence such as a utility demand-response event). In some implementations, the series of reports may be delivered via email and/or on the web. In some implementations, the series of reports may include a link back to a web site of the cloud-based platform, which may provide more detailed charts and analytic results than those included in the reports.

In some embodiments, the statistical models may be used to generate a series of customized reports of both energy demand and use. In some implementations, the statistical models may be used to provide demand forecasting of a specific building from weather forecast data. The demand forecasting may include an advanced warning when a period of high demand in the specific building is likely to occur in the future. The advanced warning may allow the user or the customer to strategically "shave" the peak of highest demand and reduce demand charges.

In some embodiments, one or more pattern recognition algorithms may be used to analyze the energy interval data and/or non-energy interval data and identify distinct operational issues in a specific building. The distinct operational issues may include, but are not limited to, the building being started too early on certain days of the week, the building taking too long to fully shut down, the building experiencing "hard starts" in the morning that may place excessive wear on equipment, and the building experiencing brief spikes in demand that drive up demand charges. The cloud-based platform 130 may be configured to generate a set of output results based on the one or more pattern recognition algorithms. The set of output results may include the presence or absence of specific energy use patterns, and a set of related facts, for example, time, duration, severity, and long-term trend etc. In some embodiments, various energy use patterns may be quantified into dollar amounts based on time-of-use rates, demand charges, and other complex rate structures. Cost analysis may include the hypothetical cost or savings associated with alternative energy use patterns.

In some implementations, the pattern recognition algorithms that apply to a specific building may be trained according to a pre-defined set of energy use patterns of the specific building. In some implementations, the one or more pattern recognition algorithms that apply to a specific building may be iteratively refined by matching the set of output results with judgments of human energy analysts.

In some implementations, the factors considered under the one or more pattern recognition algorithms may be dynamically constructed or expanded using machine learning algorithms. For example, feedback from energy analysts and/or customers may be constantly collected and analyzed to refine the existing pattern recognition algorithms.

In some embodiments, the cloud-based platform 130 may be configured to measure the effectiveness of energy efficiency projects, or alternatively to measure the deleterious effects of operational changes or changes to the building's physical plant, by automatically assembling a relevant historical description of the building behavior. In some embodiments, the automated assembling may include collecting historical energy interval data of a specific building and local historical weather data and decomposing the building's energy use into a plurality of categories by applying one or more proprietary statistical algorithms. The plurality of categories may include, but is not limited to, baseload energy use when the specific building is unoccupied, temperature-dependent load, and occupancy-dependent load. In some embodiments, other historical non-energy interval data of the specific building, such as security systems, badge readers, $CO_2$ sensors, lighting systems, etc. may be automatically collected and analyzed. In some implementations, load curves of energy use may be decomposed to demonstrate actual or possible energy saving options in different specific categories or activities.

In some embodiments, the cloud-based platform 130 may be configured to define a "pre-project" baseline period of energy efficiency projects and to develop a statistical model of building energy use based on the baseline period. The statistical model may be used to project energy use forward into the post-project period by combining historical weather data. The output of the baseline energy model may be compared with the actual post-project energy use to determine the savings that can be attributed to the energy efficiency projects, or the costs associated with changes to building operations or physical plant. In some implementations, detailed rate modeling that includes time-of-use and demand effects may be combined into the analysis to provide more accurate return on investment (ROI) analysis. Not only total energy savings but also whether or not a specific energy efficiency project is yielding financial benefits, may be provided. In some implementations, the pre-project and post-project periods may be subject to statistical analysis for the presence of operational issues, including but not limited to elevated off-hours energy use, to characterize changes to building energy use due to changes to building operations or physical plant.

In some implementations, the categorized data may be used to provide comprehensive evaluation of one or more energy saving projects. The categorized data may be used to determine total energy savings and categories from which the savings are coming. Energy savings from the multiple energy saving projects may be distinguished and separated. For example, savings from decreased temperature responsiveness, lower baseload, or lower occupancy-driver demand, etc. may be distinguished and separated from each other.

In some implementations, a rate engine may be provided to model complex utility rate structures, including rate options that may be specific for each customer. The rate engine may be used to model point of use effects according to different rates based on time of day, week, or season. Demand charges may be compared with use charges in a use-defined period of time. In some implementations, hypothetical analysis may be provided on the cost of a specific event occurring at certain times of day and/or the cost of ongoing events. Cost savings may be estimated and determined for specific actions.

In some implementations, the hypothetical analysis and/or statistical models may be used to identify and diagnose possible operational problems such as equipment being activated at inappropriate times, simultaneous heating and cooling, excessive unoccupied energy use, etc. In some implementations, the cloud-based platform 130 may be configured to allow users or customers to track the presence and severity of ongoing issues in each of the plurality of categories over time and provide the users or the customers the specific underlying data of the ongoing issues.

Computer System Overview

Figure 2:
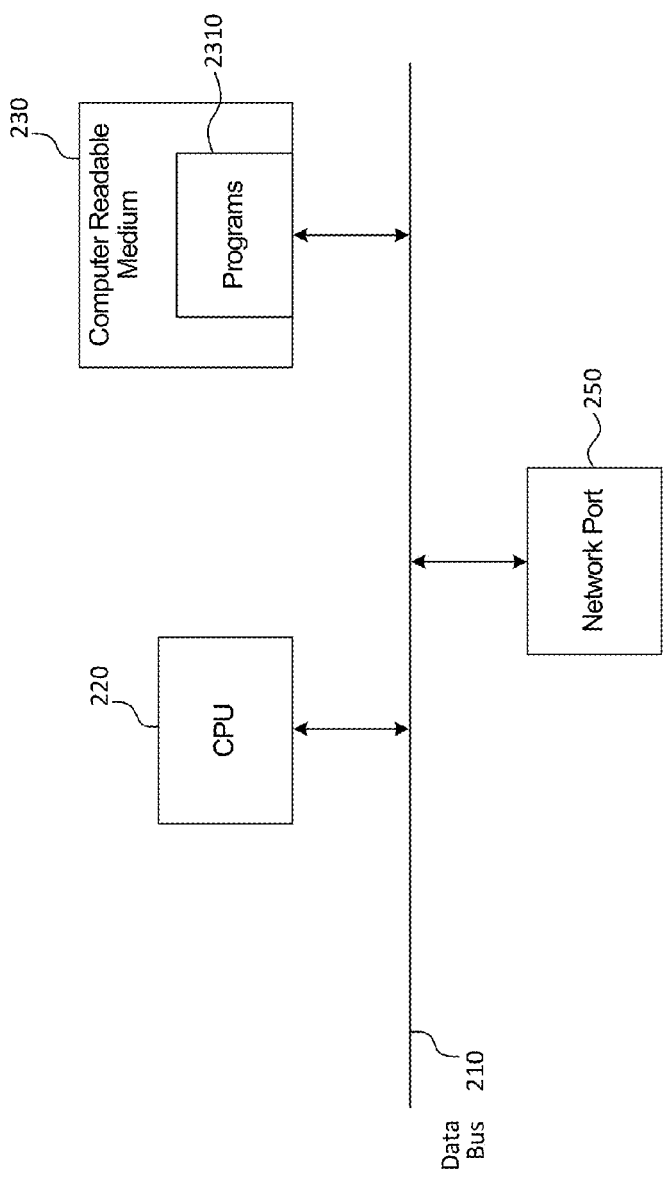
FIG. 2 illustrates an exemplary cloud-based platform according to another embodiment of the present disclosure.

FIG. 2 illustrates a schematic block diagram of at least a portion of a cloud-based platform 130 according to certain embodiment(s) of the present disclosure. The cloud-based platform 130 may include, but is not limited to, one or more server computers. Each server computer may include at least a processor or a central processor unit ("CPU") 220, one or more network port 250, and one or more computer readable medium 230, all interconnected via one or more data bus 210. Each server computer preferably may include an operating system such as, but not limited to, Windows™, Linux™, or Unix™ The computer readable medium 230 may be any medium device that is configured to store data such as a hard drive, RAM, ROM, flash memory, electrically erasable program read-only memory (EEPROM), CD-ROM, digital versatile disks (DVD), or the like.

Programs 2310 may be stored on one or more computer readable media 230. The programs 2310, when executed by the processor(s) 220, may cause the processor(s) 220 to perform certain operations. In some implementations, the operations may include, but are not limited to, collecting energy interval data of a specific building with a fixed time interval; collecting local historical weather data with the fixed time interval or a different fixed time interval; pairing the energy interval data with the local historical weather data; analyzing paired energy interval data and local historical weather data according to one or more analytic algorithms; and providing an option to reduce energy bills of the specific building.

In some implementations, the operations may further include collecting financial data of the building, the financial data including historical utility bills, utility rate structures and billing cycle dates; combining the financial data with the energy interval data; analyzing interactions between use charges, demand charges, special incentive programs, rate options, and time-of-use effects; collecting weather forecast data in the area of the building; and generating a report on energy demand and use predictions of the building according to the one or more analytic algorithms. A variety of well-known mathematical algorithms may be used in analyzing the combined energy and non-energy data. For example, semi-parametric regression models may be used to estimate the non-linear effects of weather variables upon building demand and usage. Time series methods, e.g. autoregressive integrated moving average (ARIMA) and state space models, may be used in conjunction with semi-parametric regression using a two-step estimation technique. In some implementations, customized algorithms may be used to take account of a variety of building types and situations. For example, a customized algorithm may be used to determine when data is adequate to fit the preferred semi-parametric regression model and default to a less accurate but computationally more robust ensemble model (e.g., a random forest regression tree method etc.) as a backup when the preferred model fails.

In some embodiments, the operations may include identifying energy use patterns of the building and providing ongoing analysis of energy performance of the building. In some embodiments, the operations may include decomposing energy use of the building into a plurality of categories and providing energy budget forecast of the building according to a range of variances in each of the plurality of categories.

System Platform Data Collection Overview

Certain embodiments contemplate a platform system hosting an online, multitenant data store and set of analytic services for aggregating data related to electricity use in buildings. The platform system may deliver reports based on statistical analysis or other forms of algorithmic processing of the data. At regularly scheduled intervals (daily in some embodiments) the platform system may retrieve electricity interval data from an external data source. Electricity interval data may include a series of timestamped energy values (typically measured in kilowatts or kilowatt-hours) collected at regular intervals (every fifteen minutes in some embodiments, but longer or shorter intervals may also be used).

In one example, the primary data source may be a smart meter or other form of utility-provided advanced metering infrastructure. The system may collect data from these meters and present the data online via a customer-accessible data portal. Certain embodiments of the platform employ a flexible plug-in architecture that allows for easy extension to other electricity sources, including on-premise submeters, building management systems (BMS), and third-party data portals.

In addition to retrieving electricity interval data, certain embodiments contemplate retrieving historical weather data that is local to the buildings under analysis at regularly scheduled intervals (daily in certain embodiments). The collected weather data may be from a coincident time period with the corresponding energy interval data. However, the timestamps of the weather data may not match the energy data exactly. Rather, the bounding dates of the two datasets may only approximately match. In some embodiments the weather data point are recorded at irregular, aperiodic intervals. In some embodiments the weather data may include dry bulb temperature, wet bulb temperature, humidity, precipitation, cloud cover, where available, wind speed, wind direction etc.

A "local" weather station may refer to a weather station that is within reasonable geographic proximity to the electricity data source. The system platform may rely on data from the weather station that yields the best predictive accuracy. The predictive accuracy may be indicated by the error term of a statistical regression model that uses weather as a predictor of electricity use. In many instances this may be the nearest weather station to the building. Various of the contemplated embodiments automatically select a weather station based on a combination of factors including data quality and predictive accuracy. Automatic weather station selection is a three-step process: first, a set of candidate weather stations is created based on geographic proximity; second, weather stations with significant data gaps or an insufficient number of readings per day are eliminated from the set; finally, regression models are created using each weather station as the predictive data source and energy use or demand as the predicted output. A weather station may be selected using coefficient of variation or other standard goodness-of-fit statistics to determine which weather station has the best predictive accuracy. In some embodiments, composite weather stations are created by taking blended averages from several weather stations and also testing the predictive value of the composite data. Such composite stations are used in situations where an energy data source is roughly equidistant from several different stations, or when all nearby stations have data quality issues and therefore need to be aggregated together to yield a complete weather history.

Billing data retrieved by the system may include data associated with each source of electricity. For example, billing data may include bill cycle start and end dates, billing tariff, billing tariff options, bill line items, and bill inputs. Bill cycle start and end dates are the boundaries of a period of electricity use for which a customer is charged. A billing tariff is a rate plan or set of rules the utility uses to calculate charges from a customer's historical electricity use. Billing tariff options are a set of configurable choices that determine what kind of services a customer receives from utilities and how they rate rules are applied to their electricity use. An example of tariff options includes customer participation in a utility demand response program.

In some instances, bill line items are individual charges that make up a bill. Often utility billing data is unstructured; bills may simply be collections of line items. Various embodiments interpret these individual line items and place them into a semantic framework that allows charges to be rolled up, tracked over time, and compared across utilities. That semantic framework categorizes line items as electricity use charges, electricity demand charges, power factor charges, special program charges, and other charges. Bill inputs may be the raw energy values that are used as inputs to bill calculation, typically measured in kilowatts, kilowatt-hours, and kvar. Categorization may take place along three different dimensions: line items that share a billing unit (e.g., kilowatts or kilowatt-hours) can be grouped together; line items that share a time-of-use designation, indicating the time of day and week in which the charge was incurred, can be grouped together; and line items can be arbitrarily grouped together using a proprietary data dictionary that maps line item descriptions to category types. For example, the data dictionary for Pacific Gas & Electric categorizes the line item with description "PDP kW Credit" as a demand charge related to the PDP program. The data dictionary supports wildcard and regular expression matching.

System Platform Operation Overview

Figure 3:
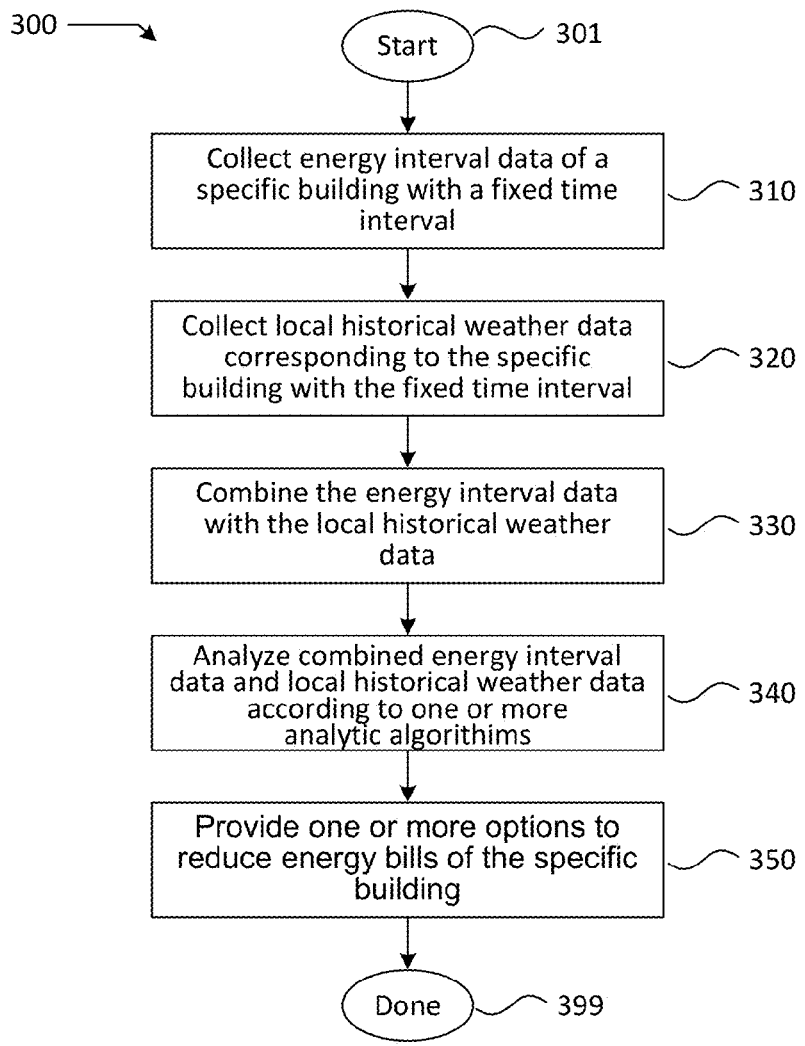
FIG. 3 illustrates a flow chart showing a set of exemplary operations 300 that may be used in accordance with yet another embodiment of the present disclosure.

FIG. 3 illustrates a flow chart showing a set of exemplary operations 300 that may be used in accordance with yet another embodiment of the present disclosure. At step 310, energy interval data of a specific building may be collected with a fixed time interval. At step 320, local historical weather data of the specific building may be collected. In some embodiments, non-energy data, for example, utility bills, energy rate plans, billing cycle dates, and digital data of the building (e.g., security system, badge readers, $CO_2$ sensors, and lighting system etc.), may be downloaded and collected. In some embodiments, the local historical weather data may be collected with substantially the same fixed time interval. The fixed time interval may be any suitable time interval such as minutes, hours, days, weeks, months, etc.

In some embodiments, the energy interval data may be paired or correlated with the local historical weather data, step 330. In some embodiments, the energy interval data may be paired or correlated with collected non-energy data, including the local historical weather data.

At step 340, paired energy interval data and local historical weather data may be analyzed according to one or more analytic algorithms. The analysis may be conducted by the cloud-based platform 130 and/or the cloud computing service 160. One or more options may be provided to reduce energy consumption and energy demand costs of the specific building according to the analysis results of the paired data, step 350.

Figure 4:
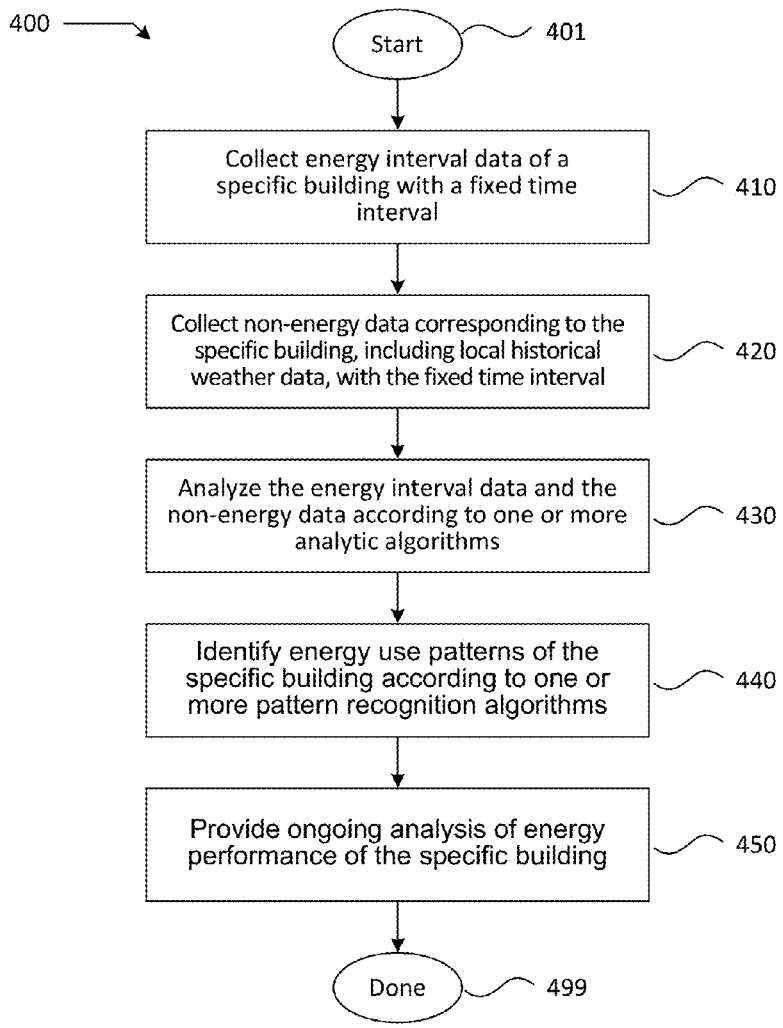
FIG. 4 illustrates a flow chart showing a set of exemplary operations 400 that may be used in accordance with yet another embodiment of the present disclosure.

FIG. 4 illustrates a flow chart showing a set of exemplary operations 400 that may be used in accordance with yet another embodiment of the present disclosure. At step 410, energy interval data of a specific building may be collected with a fixed time interval. At step 420, non-energy data of the specific building, including local historical weather data, may be collected. In some embodiments, the non-energy data may be collected with substantially the same fixed time interval. In some embodiments, the non-energy data may be collected with a second fixed time interval. At step 430, the energy interval data and the non-energy interval data may be analyzed according to one or more analytic algorithms. Energy use patterns of the specific building may be identified according to one or more pattern recognition algorithms, step 440. In some implementations, the one or more pattern recognition algorithms may be determined by a pre-determined set of energy consumption patterns and/or iteratively refined by matching identified patterns with judgments of human energy analysts. At step 450, ongoing analysis of energy performance in the specific building may be provided.

Figure 5:
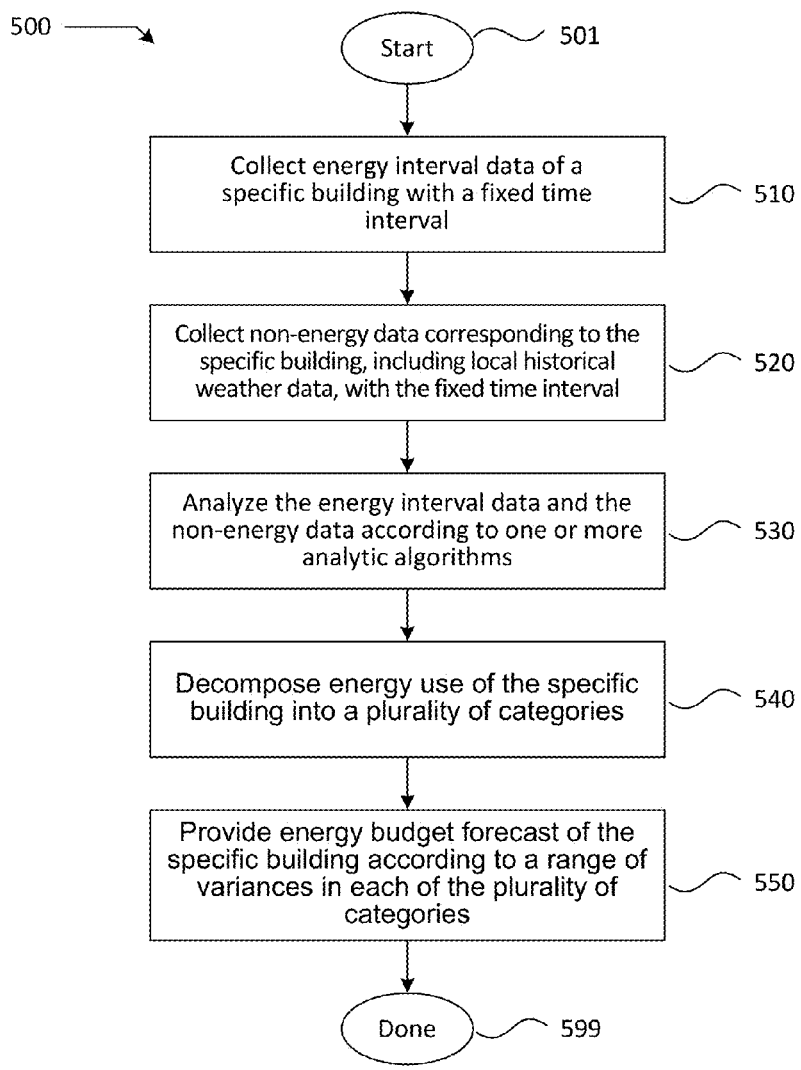
FIG. 5 illustrates a flow chart showing a set of exemplary operations 500 that may be used in accordance with yet another embodiment of the present disclosure.

FIG. 5 illustrates a flow chart showing a set of exemplary operations 500 that may be used in accordance with yet another embodiment of the present disclosure. At step 510, energy interval data of a specific building may be collected with a fixed time interval. At step 520, non-energy data of the specific building, including local historical weather data, may be collected with the fixed time interval. In some embodiments, the non-energy data may be collected with substantially the same fixed time interval. In some embodiments, the non-energy data may be collected with a second fixed time interval. At step 530, the energy interval data and the non-energy interval data may be analyzed according to one or more analytic algorithms.

Rate Engine Overview

Certain embodiments employ a rate engine that embodies utility tariff logic, allowing bills to be reconstructed exactly from energy interval data. The rate engine may include features that analyze aspects such as time-of-use rates, demand charges, special program charges such as price response or demand response, and configurable rate options. For example, many utilities provide different interconnection voltages to customers depending on need, with different rates applicable depending upon the voltage level. In certain embodiments the rate engine models rates at a granular level, allowing, for example, generation charges that don't apply to third-party power purchasing to be selectively removed from the rate calculation. Further, the rate engine models may change in utility rate logic over time, including complex situations such as billing periods that span two different rate seasons or two different rate regimes. The rate engine may be developed as a plug-in architecture so that it can be easily expanded to new utilities and new tariffs over time.

In operation in certain embodiments, the rate engine may take as input the following elements: an interval data load curve, a set of relevant calendar events such as holidays or demand response events, and a set of tariff options (such as program participation, voltage level, etc.). The first step in the operation of the rate engine may be summarization of the input energy data. For time-of-use tariffs, for example, the individual energy data points may be categorized by time-of-use period and then aggregated in ways relevant to rate calculation. The result may be a set of summary statistics to which rate calculations can be applied, including total energy use and peak energy demand, categorized by time-of-use period. These summary figures may be available as an output of the rate engine, allowing for fine-grained analysis of the drivers of energy costs (such as year-on-year shifts in the amount of charges related to program participation or peak demand charges). Rate rules may then applied to the summary values to reconstruct a utility bill.

An alternative mode of operation in certain embodiments may allow the rate engine to take as input the intermediate summary values rather than raw energy interval data. This mode of operation may allow for easy analysis of the impact of what-if operational scenarios on utility bills. For example, if a user wants to understand the impact of reducing off-peak energy use by 10%, rather than generating a hypothetical energy load curve, which can be a compute-intensive task, the system may instead adjust the summary output from the rate engine, reducing the off-peak use figure by 10%, submitting it back to the rate engine for pricing, and receiving an updated result. The end result may be fast, responsive, and accurate scenario analysis for translating hypothetical energy events into monetary impacts.

Automated Demand Prediction Overview

Certain embodiments of the platform system implement demand prediction services using the collected data. Demand prediction services may be used to predict peak demand days in a utility customer's billing cycle. This information may be meaningful to customers because most utilities charge customers not just for total use, but also for the peak rate of use. With advanced knowledge of peak demand days, customers can strategically curtail demand at specific times to limit demand charges. The system may also forecast future bill cycle boundaries to calculate the probability that a predicted peak is the true peak for the entire billing period, rather than just a temporary peak.

Figure 6:
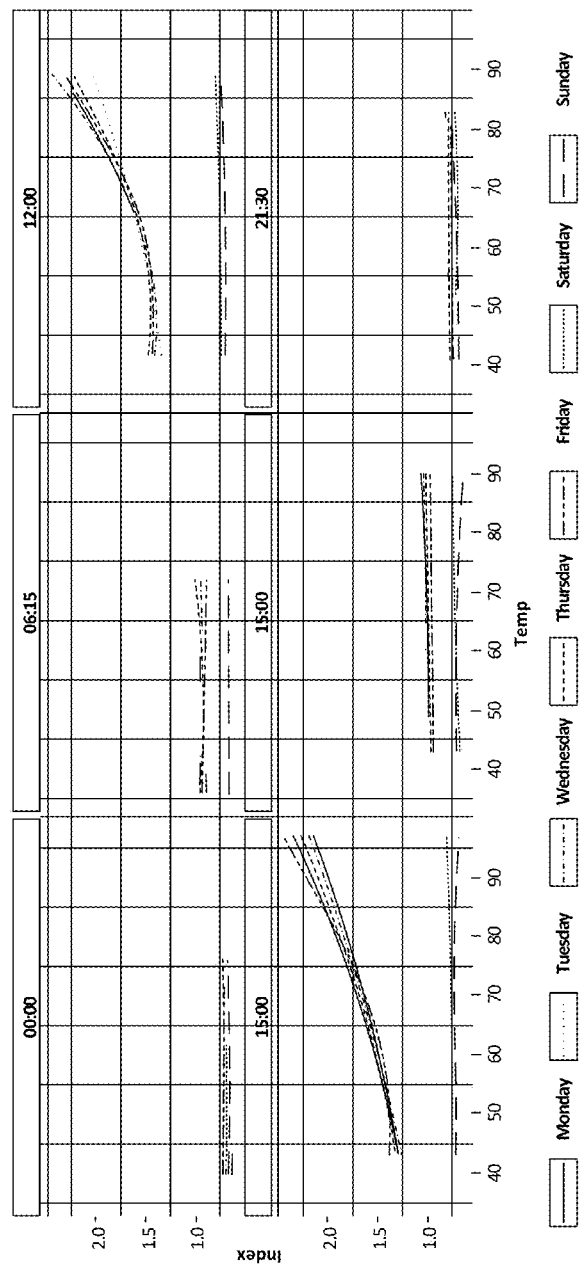
FIG. 6 is a series of plots depicting demand (represented here as an index on the vertical plot scale) as a function of temperature at six representative times of the day for an implementation of certain embodiments.

In some embodiments, the demand prediction service may operate by building a statistical model of building electricity use based on historical use and weather data. In certain embodiments, the demand model combines 15-minute interval and weather data to estimate time of day-specific temperature response as a non-linear function. FIG. 6 illustrates demand (represented here as an index on the vertical plot scale) as a function of temperature at six representative times of the day. These embodiments may use a GAM, although one will recognize that alternative models using other forms of non-linear regression may also be used.

Certain embodiments may combine the regression model with a time-series analysis of long-term energy use trends that operate independently of fluctuations in the weather. For example, schools have a strong seasonal energy usage pattern. Buildings experiencing ongoing growth in occupancy may also display weather-independent trends in energy use. In certain embodiments, the system may use time series analysis to improve the predictive accuracy of the model by accounting for these weather-independent trends. The system may model these trends using statistical time series techniques such as autoregressive integrated moving average (ARIMA) or state space models. This approach assumes that seasonal patterns and trends are persistent and may be reliably forecast through the forecast period.

Certain embodiments model intraday electricity use, allowing precise calculation of expected costs based on an application of utility rate models to a predicted energy load curve. For example, if the utility provider measures and bills customers based on 15-minute increments, the system may model electricity use at the 15-minute level.

In certain embodiments, the systems' statistical model of electricity use may be derived from historical weather data and use data. In some embodiments the system's predictive service includes a billing cycle prediction mechanism that uses a plug-in architecture to allow prediction rules to vary by utility. Some utilities publish billing schedules that allow billing cycle boundaries to be predicted exactly. Other utilities do not follow a published schedule, in which case the platform system makes statistical inferences regarding the most likely billing boundary dates based on a frequency analysis of billing cycle length and billing cycle day of week. For example, such analysis of historical bills might reveal that 29% of billing cycles are exactly 30 days long, 25% are 31 days long, etc. Further, such analysis of historical utility bills might further reveal that 18% of billing cycles may end on a Friday, 3% on a Saturday, etc. These frequency analyses enable creation of a probability distribution of billing cycle end dates based on the current billing cycle start date. Frequency analysis is performed on a per-utility basis. Billing cycle probability distributions can in some cases be improved by dividing historical bills into categories based on attributes, such as tariff or customer size before performing frequency analysis.

In some situations, accurate weather forecasts are only available for the next 5-7 days, but billing cycles may be typically 30 days or more in length. Accordingly, in some embodiments, early in a billing cycle, the platform incorporates historical weather data to calculate long-term demand probabilities. In certain embodiments, the demand forecasting model provides a comprehensive analysis of the uncertainty of these peak demand forecasts.

Figure 7:
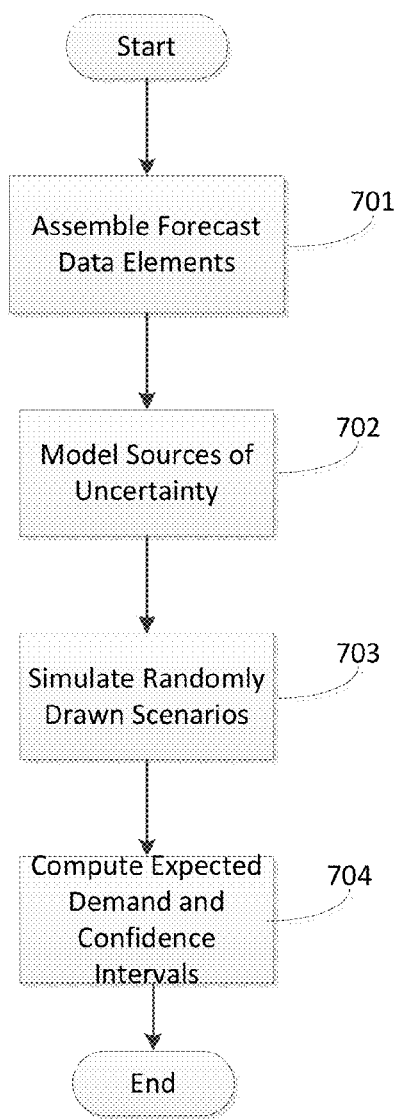
FIG. 7 depicts a process flow diagram for assessing long-term uncertainty in peak demand forecasts in certain embodiments.

The process of assessing long-term uncertainty in peak demand forecasts implemented in certain embodiments is depicted in FIG. 7. To compute these long-term demand probabilities, a comprehensive set of data sources may be first assembled at step 701, including energy interval data, 10 years of historical weather data, historical weather forecast data, billing history data, 7-day weather forecast data, a calendar of holidays, and projected future billing cycle dates.

Next, at step 702, the system may model sources of uncertainty. Each source of forecast error may be modeled by fitting an appropriate statistical probability distribution function using maximum likelihood or other appropriate techniques. Each probability distribution may be specified as a distribution type (e.g. normal or beta probability distribution) as well as an accompanying variance-covariance form (e.g. independence, first-order autocorrelation) among and within variable types.

Each source of forecast error may be modeled by fitting an appropriate statistical probability distribution function using maximum likelihood or other appropriate techniques. Each probability distribution is specified as a distribution type (e.g. normal or beta probability distribution) as well as an accompanying variance-covariance form (e.g., independence, first-order autocorrelation) among and within variable types.

Sources of variability modeled may include:

Model Forecast Error. The distribution of model forecast error is fit as a function of the number of days into the future.

Weather forecast error. For each day for which a weather forecast is available (typically 7 days), the historical accuracy of weather forecasts is modeled by comparing past forecasts against actual observed weather conditions for the date forecasted. Weather forecast distributions are allowed to vary by: the number of days ahead for the forecast (e.g. 1-day-ahead forecast have lower variance than 2-day-ahead forecasts, etc.); time of day; the temperature range of the forecast, e.g. forecasts for hot summer periods have a different distribution shape than cooler winter forecast periods.

Weather variability beyond 7 days. Since forecast data is not available beyond approximately 7 days, a probability distribution of expected temperature for each day of the year and time of day is computed. This temperature probability distribution is used to predict demand for dates beyond the available forecast horizon.

Billing period variability. If a calendar of pre-defined billing period start and end dates is available, there is no uncertainty of this type. However, if such a calendar is not available, a range of expected billing dates may be estimated using historical billing date patterns, and this source of uncertainty is incorporated into the estimation.

At step 703, the system may simulate randomly drawn scenarios. Once a complete of probability distributions has been estimated for each source of uncertainty, Monte Carlo simulation methods may be used to create a complete set of independent variables for each quantity required to estimate demand via the regression model throughout the remainder of a given billing month.

For each date-time having a weather forecast, the system may generate a random number with mean set equal to the forecasted temperature and variance as determined by the corresponding probability distribution.

For date-times after the last available forecast value, the system may use a randomly generated sequence of random numbers drawn from the corresponding 10-year weather history probability distributions.

The system may append other independent variables derived from calendar effects (day of week, holidays, etc.) to create a complete set of independent variables.

Predicted demand for each date-time in the simulation period is then estimated by applying the regression model coefficients. The simulation process as described is then repeated many times (typically 1,000) to create a representative range of simulated scenarios encompassing the range of typical weather patterns possible throughout the end of the billing month.

Finally, at step 704, the system may compute expected demand and confidence intervals. The simulated demand levels may then be aggregated into simulated billing months, and the predicted peak demand for each simulation calculated. These simulated peak values may then be compared with actual peak-to-date values as well as among themselves to estimate the probability of any given date (past actual or predicted future) representing the peak for the month.

Figure 8:
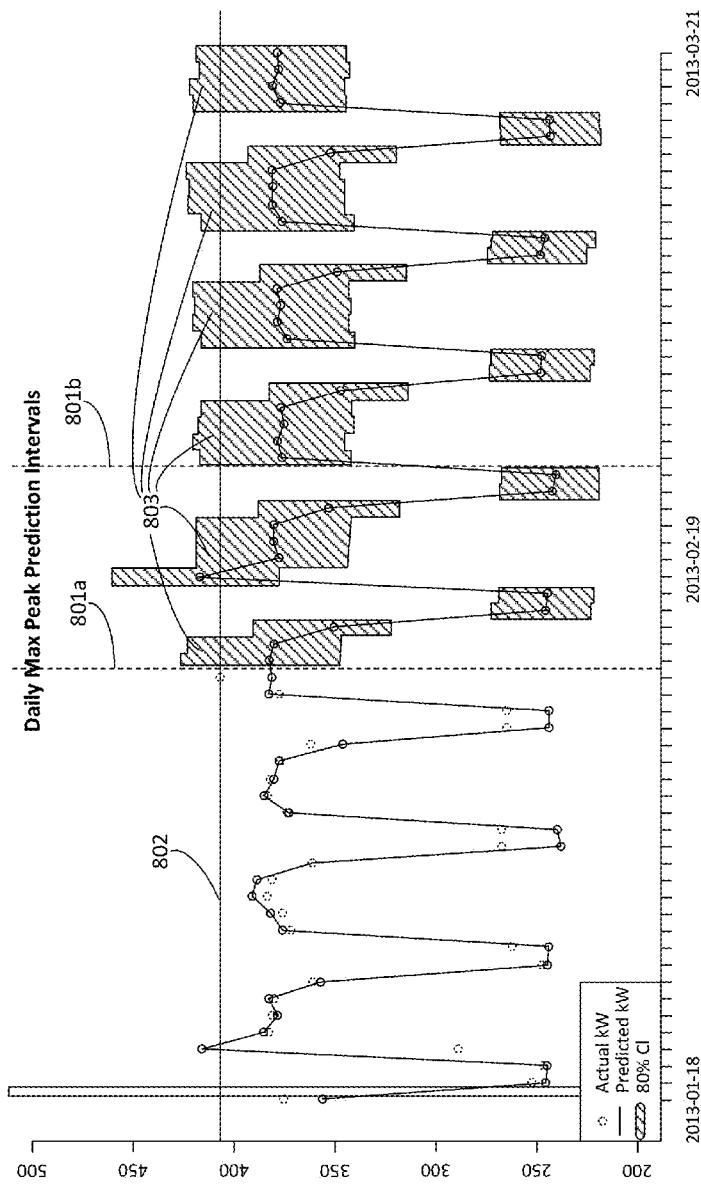
FIG. 8 shows the summary output of a simulation assessment computing expected demand and confidence intervals using the process described with respect to FIG. 7.

FIG. 8 shows the summary output of one such simulation. The two vertical dotted lines, 801*a*, 801*b*, indicate the dates remaining in the billing period. The grey shaded regions 803 show the confidence intervals obtained from the analysis as described above, with a horizontal line 802 marking the actual peak-to-date measured for the current billing month. The likelihood of exceeding this value may be determined by calculating the extent to which the confidence intervals exceed this value.

Automated Curtailment Recommendations

Commercial electricity tariffs often include charges for electricity demand as well as electricity use. Use is a measure of energy, typically billed in units of kilowatt-hours. Demand is a measure of power, or use per time, typically billed in units of kilowatts. Use is a cumulative measure; kilowatt-hours can be summed across an entire billing period, or across portions of a billing period, according to utility tariff logic. Demand, on the other hand, is an instantaneous measure of the rate of use at an particular point in time. Interval meters typically report the average demand value at 15-minute increments, although other increments, such as half-hourly or hourly, are possible. Because demand readings can't meaningfully be summed, billing rules for demand differ from billing rules for use. Often utility tariffs specify that demand charges are calculated by applying a per-kilowatt rate to the single highest demand reading in a billing period, or to the highest demand reading across a portion of the billing period, as specified by time-of-use rules. A single bill can contain several demand charges, pertaining to different time-of-use periods.

Because demand charges may often be based on the highest demand readings during a billing period, individual days or energy events can have a disproportionate effect on the total utility bill. For example, Building A might normally have maximum demand of 100 kW. On an exceptionally hot day, increased cooling load causes a secondary chiller to turn on driving demand to 200 kW for three hours. Even though the increased demand only occurs for 0.4% of a 30-day billing cycle, the excess load causes a doubling of demand charges.

Building managers have some discretion over the peak demand in their buildings. Simple measures, such as turning up the thermostat on hot days, turning off common area lighting during daylight hours, shutting down fountains and other decorative elements that draw power, etc., help to reduce peak demand. Such measures are not costless, because they require management attention and may affect tenant comfort, but on a temporary basis they are effective at reducing a building's power draw. This discretionary element forms the basis of demand response and other programs that encourage strategic demand curtailment on days of peak demand.

A problem that may face building managers who wish to reduce their demand charges is that they don't know either when to curtail demand or how much to curtail. Much demand is driven by weather, with hot days typically driving increased demand due to increased cooling requirements (although in buildings with electric heating, cold days can also drive increased demand). Attempting to reduce demand on all hot days may result in wasted effort. Assume, for example, that a building manager successfully limits demand to 100 kW for the first 29 days of a billing period. On the 30th day, extremely hot weather drives demand to 110 kW, erasing the financial benefits from previous curtailment efforts. Or assume, for example, that a building has already set a demand peak of 110 kW early in the billing cycle. Any subsequent efforts during the billing cycle to reduce demand below 110 kW will be wasted, because that demand level has already been reached. Finally, assume for example that an upcoming heat wave is expected to drive demand to high levels for the next 5 days. There is little benefit to the building manager in curtailing demand for only 2 of the 5 days, because any financial benefits will be undone by the days in which no curtailment occurs.

The problem may thus be one of uncertainty. There is a cost to curtailment in the form of management effort and tenant comfort. There is a potential benefit in the form of reduced demand charges. Curtailment makes sense if the benefits outweigh the costs, but performing the cost-benefit comparison requires taking into account complex contextual information, such as billing cycle boundaries, demand costs, and current billing cycle demand peak to date; as well as complex probability forecasts, including long-term weather distributions, billing cycle end date uncertainty, and building weather response uncertainty.

Figure 9:
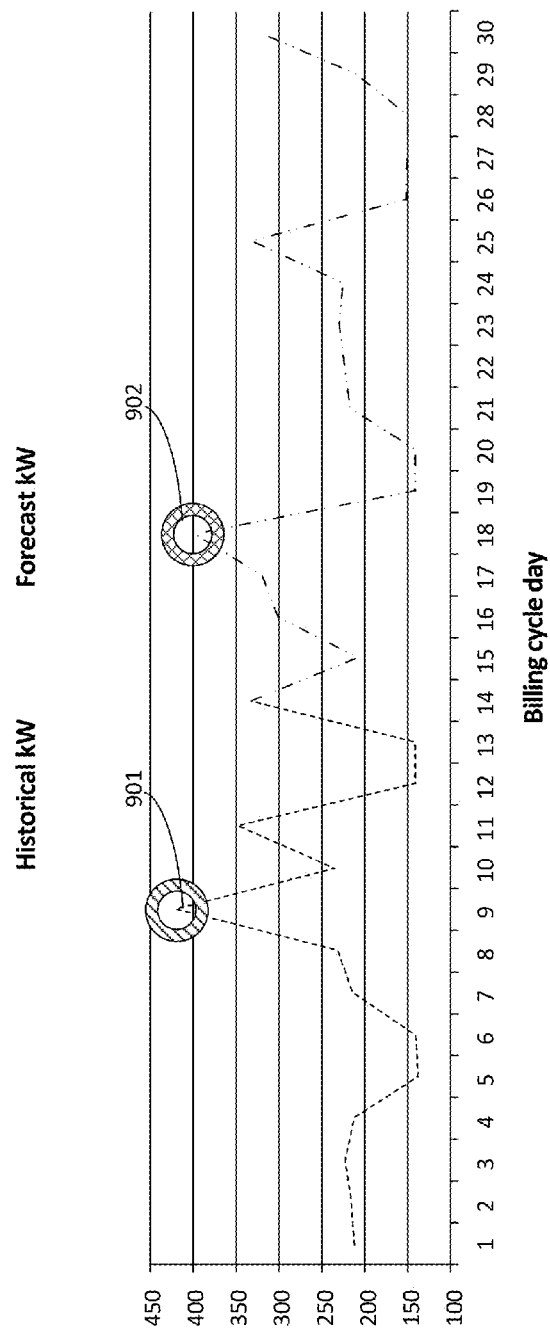
FIG. 9 is a plot of building energy use over time which illustrates a situation in which a demand forecast may reveal upcoming high demand, but may not present an opportunity for demand savings.
Figure 10:
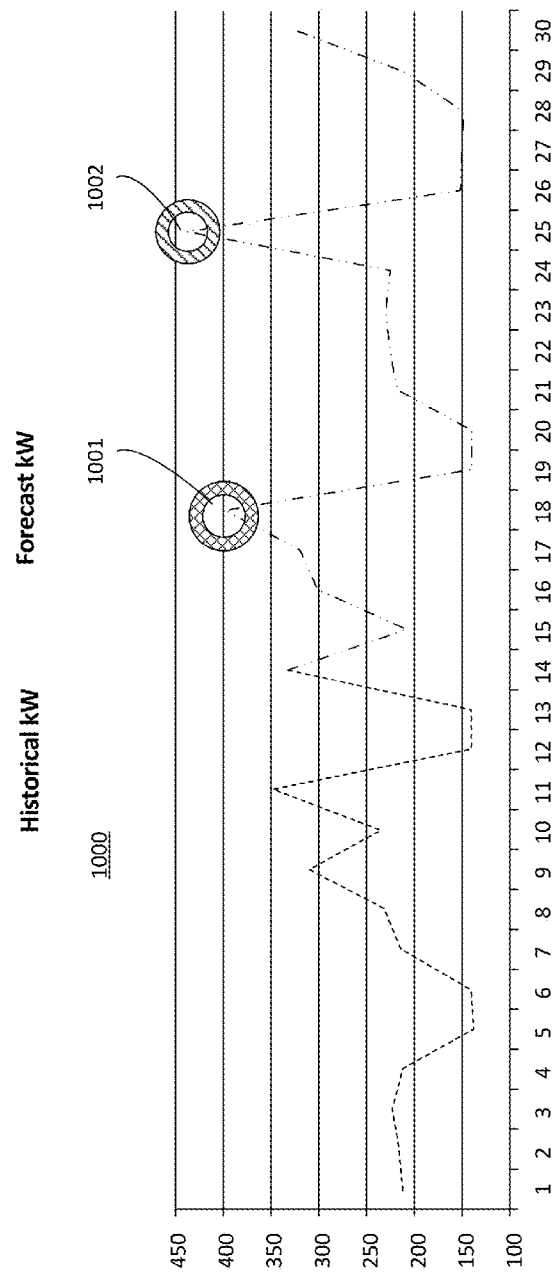
FIG. 10 is a plot of building energy use over time which illustrates a situation in which curtailment may be inadvisable.
Figure 11:
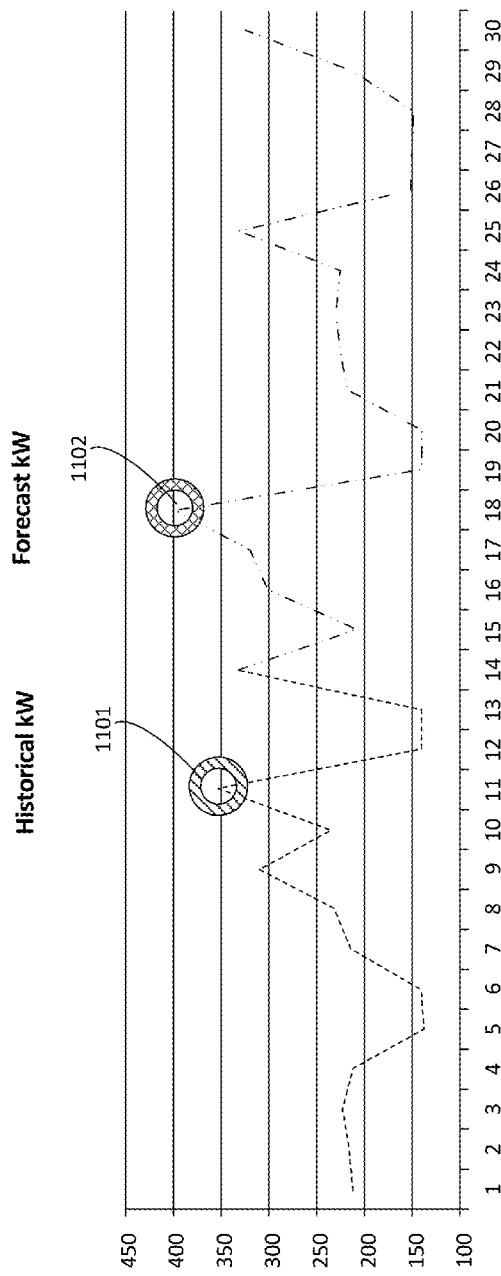
FIG. 11 is a plot of building energy use over time where 1 day of curtailment may make sense.
Figure 12:
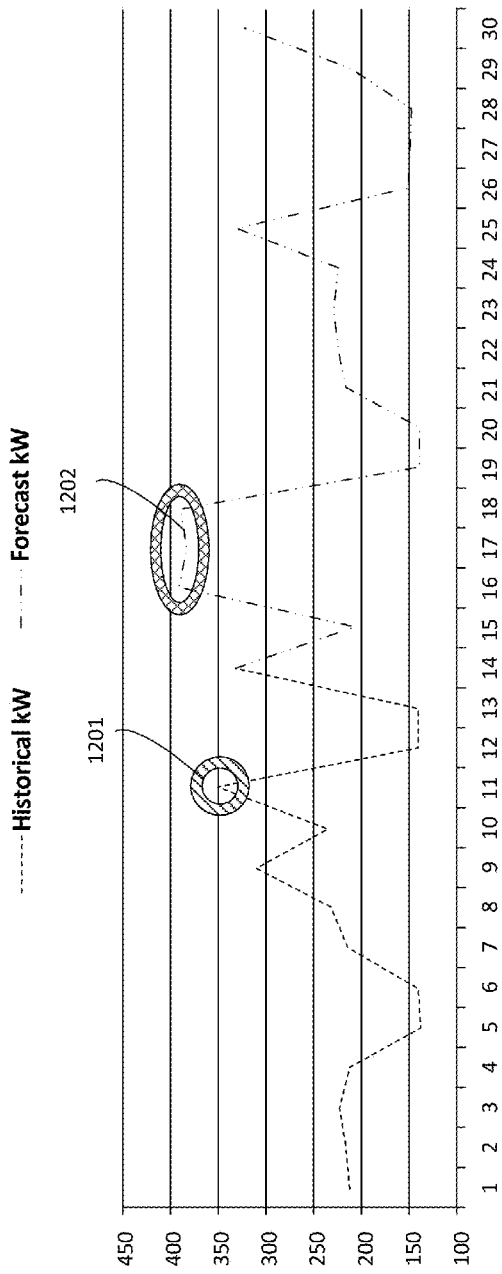
FIG. 12 is a plot of building energy use over time illustrating a situation in which 3 days of curtailment may be rewarded.

FIG. 9 illustrates a situation in which a demand forecast reveals upcoming high demand, but no opportunity for demand savings. The forecast demand level of approximately 400 kW 902 is high, but still significantly below the peak to date of 420 kW 901. Curtailment efforts on this day may be wasted, even if successful. FIG. 10 shows another situation in which curtailment may be inadvisable. Even though the upcoming demand peak 1001 is forecast to be higher than the current peak to date, it is likely to be eclipsed as the billing cycle peaks by later higher demand 1002. Curtailment efforts on Day 18 may result in demand savings, but only if future curtailment efforts on Day 25 are also successful. Because curtailment bears a cost, it may make more sense in this case to focus efforts on Day 25 exclusively. FIG. 11 shows a case where 1 day of curtailment may make sense. The forecast billing peak 1102 is higher than both the peak to date 1101 and higher than all subsequent days forecast in the billing period. Curtailment efforts will likely be rewarded in this situation. FIG. 12 shows a situation in which 3 days of curtailment will be rewarded. Several days of high demand are forecast in succession 1202, all higher than the peak to date 1201. Curtailing any one of these days will offer little or no financial benefit, because demand on the other days is likely to be high. Curtailing on 3 days requires greater effort, but offers significantly more financial gain. These examples suggest clear-cut curtailment strategies thanks to the precision of the demand forecasts. In a real-world scenario, however, weather variability, bill cycle variability, and operational variability create wide uncertainty bounds around demand forecasts.

Certain embodiments aggregate some or all the necessary data to calculate these uncertainties and make specific recommendations regarding both the timing and amount of curtailment. In particular, by aggregating energy interval data, billing cycle data, and historical weather data on a regular (usually daily) basis, the system may be able to track billing cycle peak to date and create a predictive model of future weather-driven demand. By feeding weather forecasts, long-term weather probability distributions, and billing cycle probability distributions, as described above, the system may be able to predict the likelihood, timing, and size of future demand peaks within the current billing cycle. Taken together, this information may allow the system to make precise curtailment recommendations as described in the following section.

The system may first generate a forecast of predicted demand and demand peak probability based on local weather forecast for however many days a weather forecast is available (usually 5 to 7), as described above. Every day for which the probability of a demand peak is above a configurable curtailment threshold probability may be marked for further processing. The curtailment threshold probability reflects the fact that the system only makes curtailment recommendations for days on which there is a reasonable probability of setting a demand peak. The threshold probability values may be tuned to achieve a balance between false positive curtailment recommendations (recommendations to curtail when in fact a demand peak is not likely to be set) and false negatives (missed opportunities to curtail when doing so would reduce demand charges). These threshold probabilities are seeded by system designers, and can then be tuned by the system itself by assigning costs and benefits to historical curtailment recommendations once true demand peaks are known after the fact. Curtailment threshold probabilities can vary according to the point in the billing cycle, as in the following example illustrated in Table 1:

TABLE 1

| Days ahead | Predicted kW | Peak probability | Curtailment threshold probability | Consider for curtailment |
|---|---|---|---|---|
| 1 | 980 | 80% | 56% | Yes |
| 2 | 910 | 10% | 54% | No |
| 3 | 995 | 95% | 53% | Yes |
| 4 | 910 | 10% | 50% | No |
| 5 | 960 | 60% | 50% | Yes |

Next, the system performs a scenario analysis assuming various numbers of days of curtailment. For each number of days of curtailment, a curtailment target may be assigned. For example, the system may assume that for one day of curtailment, a building is capable of reducing peak demand by 10%. For two days of curtailment, perhaps only 8% reductions are possible. The exact curtailment targets are configured by system designers, based on building type, climate zone, building behavior, and other factors. The general principle is that buildings can curtail deeply for short periods of time, or less deeply for longer periods of time, due to the costs of curtailment.

In each scenario analyzed, the system may determine the appropriate demand target in kW by selecting the maximum of: 1) the current demand peak to date in the billing cycle; 2) predicted demand on upcoming days on which curtailment will not take place, either because the day is not included in the current curtailment scenario analysis or because the day is below the curtailment probability threshold; 3) predicted demand on days on which curtailment occurs, based on the curtailment target in the current scenario analysis. In qualitative terms, this analysis finds the target demand level beyond which there is no point in further curtailment, because the building has either already reached the target level or is likely to reach it before the end of the billing cycle.

The following example shows the demand target calculation for a scenario analysis of a single day of curtailment, as may be implemented in certain embodiments, using the demand predictions and probabilities in the example above.

TABLE 2

| 1 | Days ahead | 3 | Number of days from today |
|---|---|---|---|
| 2 | Predicted kW | 995 kW | From regression model |
| 3 | Curtailment target (%) | 10% | Configurable in system |
| 4 | Curtailment target (kW) | 99.5 kW | Item 2 × Item 3 |
| 5 | Peak to date in cycle | 920 kW | From historical energy data |
| 6 | Max non-curtailed demand | 980 kW | From day 1 of forecast |
| 7 | Possible curtailment level | 895.5 kW | Item 2 − Item 4 |
| 8 | Demand target | 980 kW | Max of Items 5, 6, 7 |

In this example, if the building is only going to curtail for 1 day, then the appropriate demand target is 980 kW. This demand target may be the floor set by the predicted peak on day 1 of the forecast. In an alternative scenario in which forecast demand on all other days is below 800 kW, then the floor would be 920 kW, the peak to date in the billing cycle. And in an alternative scenario in which both the forecast demand on upcoming days and the peak to date is below 800 kW, then the floor would be 895.5 kW, reflecting the system's target for maximum curtailment target in this scenario.

The same analysis is repeated for alternative scenarios, including curtailment periods of 2, 3, 4, 5, or more days. The system may then choose the minimum possible target demand level across all scenarios analyzed, which represents the maximum achievable demand (and cost) savings. If more than one scenario results in the same level of savings, the system may choose the one with the lowest amount of curtailment days, to minimize use effort.

Because the curtailment target percentage drops as the number of days of curtailment increases, it is not necessarily the case that more days of curtailment always equals a lower demand target. If one day in the forecast entails much higher demand than all other days, then it may make sense to focus curtailment efforts on significant reductions on that day. Reduction efforts on other days are likely to be wasted. On the other hand, if several days in a row are likely to reach similarly high demand levels, it may make sense to spread a more modest curtailment effort across all of the high-demand days; focused efforts on a single day will likely be wasted. By analyzing a complete set of curtailment scenarios, the algorithm described here may find the maximum plausible savings and make appropriate recommendations to optimize the return on the building manager's effort.

As a final step, the demand target level may be screened for materiality. If the target demand represents a trivial reduction in either an absolute or percentage sense, then the system discards the recommendation. For example, although a curtailment recommendation of 2 kW may be technically correct, such minimal savings are not worth a building manager's effort. Likewise, 100 kW of reductions might be material in a small building, but irrelevant to the operations of a 22 MW data center. The system may use absolute and percentage thresholds to screen out recommendations that don't meet the criteria for materiality.

The final set of curtailment recommendations may consist of a set of days on which curtailment should take place and a target reduction level. Data may be refreshed on a regular basis, usually daily, with updates to historical energy data, historical weather data, and weather forecast data. Predictions of significant material interest, as defined by predicted costs or predicted curtailment opportunities that surpass a threshold percentage of a building's typical monthly bill, will trigger outgoing alerts to building managers via email or other electronic means.

Load Decomposition

At step 540 in the process described above with respect to FIG. 5, energy consumption of the specific building may be decomposed into a plurality of categories by applying one or more statistical algorithms. The decomposed energy data may be used to determine not only total energy savings of one or more energy saving projects but also energy savings in each of the plurality of categories. In some implementations, options may be provided to optimize the total energy savings by optimizing energy savings in each of the plurality of categories.

Figure 13:
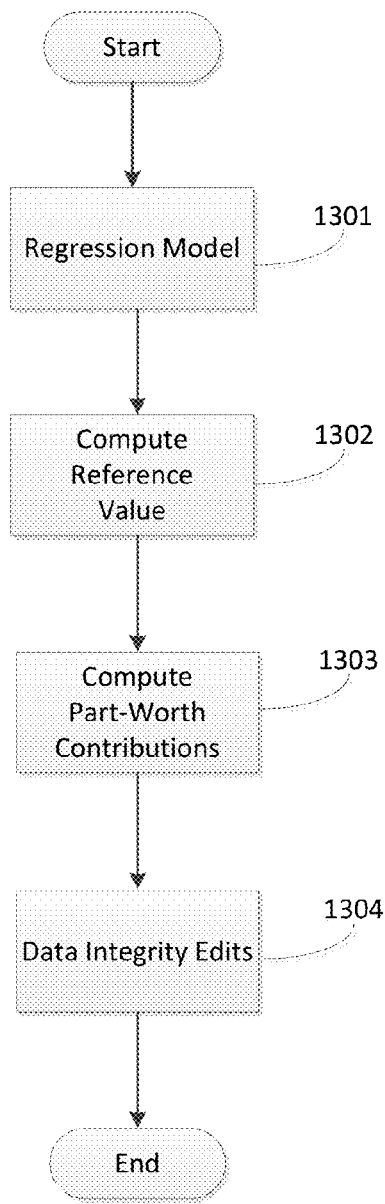
FIG. 13 is a process diagram depicting certain steps involved in computing the load decomposition in certain embodiments.

The steps involved in computing the load decomposition in certain embodiments are shown in FIG. 13. At step 1301, the system may first create a regression model using weather variables to predict energy demand or use. At step 1302, the system may then compute reference values. It may be desirable that the scheduled load and temperature effects are always positive, so that their absolute levels may be interpreted as increases relative to a hypothetical minimum value. To accomplish this, reference values for independent variables (day-time of week and temperature terms) must be calculated. These reference values represent the observed conditions at which demand is predicted to be at a minimum. Predicted values at these reference values are then subtracted from predicted values at other observed levels in the step below to ensure positive load decomposition values for the desired effects.

At step 1303, the system may next calculate part-worth contributions. The load decomposition may then be constructed from the raw coefficients estimated by the model, adjusting for the reference values above. The overall predicted demand from the regression model may be the sum of the product of each coefficient ($\beta_i$) times its corresponding dependent variable ($X_i$). The final result is a sum over all of the terms included in the model:

$$\text{Predicted Usage (kW)} = (\beta_i X_i)$$

This demand load model has a large number of i Xi terms which can be grouped (partitioned) into "buckets" which represent factors of interest in a particular analysis. For example, the model terms can be broken into three high-level buckets as follows:

$$\text{Predicted Usage (kW)} =$$
$$(\beta_i X_i) = (\beta_i X_i) \text{ Terms involving Temperature} + (\beta_i X_i) \text{ Terms}$$
$$\text{involving Time of Day} + (\beta_i X_i) \text{ All other Terms} = \text{Baseload}$$

These partial sums are then calculated for each record in the data, specifically by date and time of day. Predicted values at the reference levels are subtracted from each partial sum to ensure positive values as required. In addition, model residuals (actual demand-predicted demand) are calculated and stored.

Finally, at step 1304, the system may perform data integrity edits. The raw load decomposition values are edited to ensure totals match at pre-specified levels of aggregation.

Figure 14:
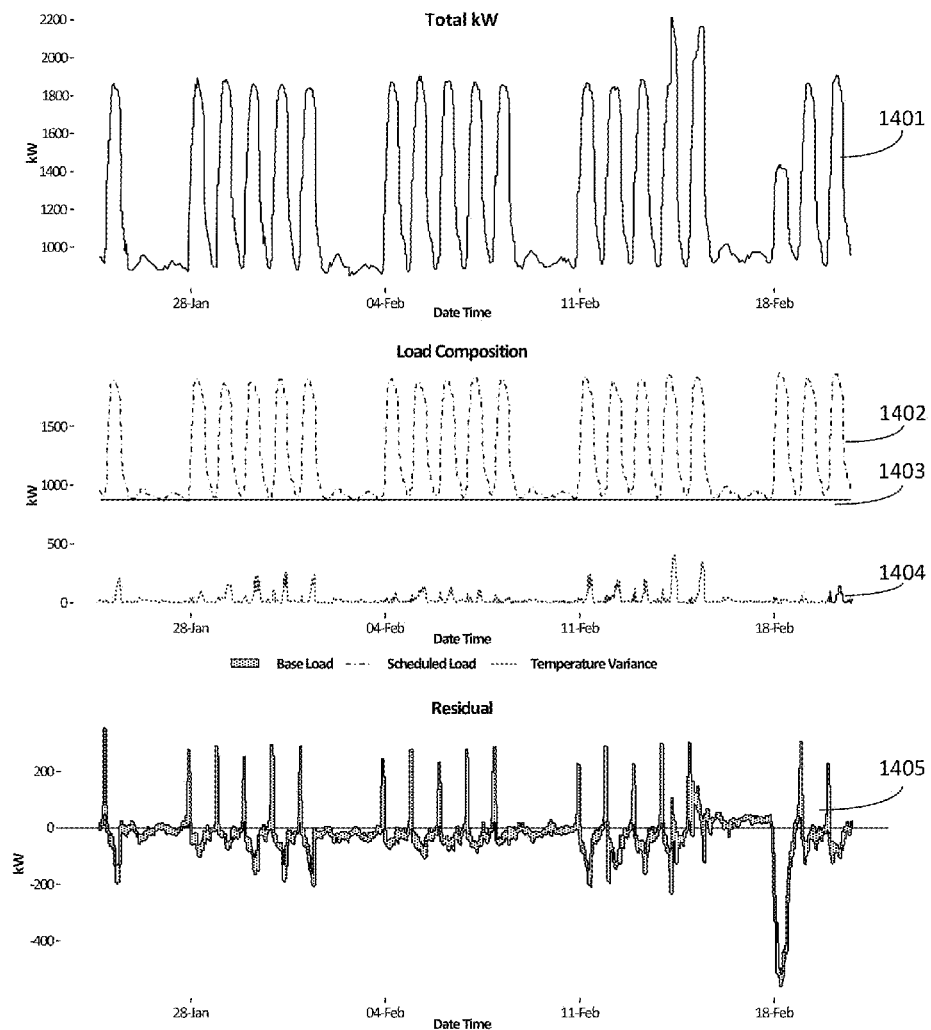
FIG. 14 is a series of plots over time depicting an example load decomposition.

The result of these operations may be a data set containing estimates of the contribution of each of these factors to the total kW demand observed at a particular date and time. The calculations are done at the lowest level of data detail available (typically building-day-interval) to maintain reporting and analytical flexibility. The contributions are stored (in a relational database or other suitable framework), and the data is aggregated on demand as required for a particular application. FIG. 14 shows an example load decomposition. Actual 15-minute interval demand values (kW) are plotted 1401 at the top. The next plot shows two components: "Scheduled Load" 1402 shows how the load curve pattern changes on average by time of day and day of week. Each day of the week has a unique demand profile represented in varying levels. The "Baseload" contribution term 1403 shows the impacts of occupancy changes or other long-term changes in the demand curve; it is interpreted as the demand seen when the building is at a state of minimal operation. Note that while baseload is relatively constant from day to day, it does gradually change to reflect longer-term changes due to seasonality or occupancy changes. The third plot shows the "Temperature" contribution term 1404, which quantifies the impact of temperature changes on the demand curve. Note that this term is defined so that it is always a positive number. The fourth plot shows the "Residual Demand" 1405 relative to the level predicted by the model. The residual demand represents deviations in building operations from nominal average levels, such as early start (seen in this example), incomplete off-hours building shutdown conditions or other faults, as well as normal random variation in building demand.

Budget Forecasting and Variance Analysis

At step 550 in the process of FIG. 5, energy budget forecasts of the specific building may be provided in each of the plurality of categories. The energy budget forecasts may encompass a range of forecast scenarios, including but not limited various long-range weather forecasts, various future building occupancy scenarios, and possible future changes to operational procedures or physical plant. In some embodiments, the energy budget can be paired with a detailed utility rate model that takes into account time-of-use charges, demand charges, and other complex pricing structures to create an energy cost budget. Analytic techniques may be used to compare the energy use and cost budget with actual energy use and cost over time and decompose the variances into specific causes, including, but not limited to, rate-related variance, weather-related variance, occupancy-related variance, and variance due to changes in building operations or physical plant.

Rate-related variance may be computed in one of several different ways, depending on the quality of the input data. Certain embodiments contemplate a rate engine that simulates utility bill calculation logic, including time-of-use charges, demand charges, program-related charges (such as those related to demand response or price response events), special rate options such as voltage level, and other features of utility rate logic that allow the system to recreate bills from an energy load curve. One feature of the rate engine is the ability to "time shift" the rate calculation. Rates change over time due to utility price updates. In some embodiments the rate engine may allow a user, for example, to apply the rate regime in effect in July 2012 to load curves from July 2013. Such time shifting encompasses pricing of calendar events such as holidays and demand response events that may shift from year to year. Applying time shifted rate regimes to a load curve and calculating the difference in the resulting bills may reveal exactly how much of the bill variance is due to rate variance, rather than operational causes. Because certain embodiments of the rate engine breaks cost calculations into individual components, it is possible to specifically ascribe cost variance to certain aspects of rate changes, such as, for example, a change in the peak demand charge. In some cases, full historical rate or load curve data won't be available, in which case the system may calculate rate variance based on a simpler comparison of average historical and present blended average demand and use rates.

Weather-related variance may be calculated by using the demand regression model to calculate two separate load curves, one based on the projected weather used to simulate future energy use for budgeting purposes, and one based on actual historical weather. The difference between the two load curves may indicate the budget variance due to weather. This variance can be described in different ways. For example, one method is to sum the total energy use from the alternative load curves and calculate a percent difference. Another way is to submit both load curves to the rate engine and calculate the percent difference in the calculated bill totals.

Operational variance may be determined by using a regression model of building energy use or demand to calculate the difference between actual and expected energy use. Certain embodiments may employ several mechanisms to calculate operational variance. One method is to plug recent historical weather into the regression model used to generate the current budget. The difference between the model's predicted energy load curve and the actual energy load curve represents operational variance. This operational variance can be characterized by several means such as summing the total use represented by the variance. Alternatively, the variance itself can be treated as a new load curve (derived by subtracting the time series of actual energy use from the time series of expected energy) and submitted to the rate engine for pricing. An alternative method of calculating operational variance implemented in certain embodiments is to create two separate regression models, one based on historical data at the time the budget was created and another based on recent building energy use. The two models may yield a contrasting set of regression coefficients that can be compared to characterize changes in building energy use. Further, weather coefficients can be removed from the decomposed regression model, allowing for a specific comparison of baseload and scheduled load over time, with weather effects controlled for. Because the regression model characterizes energy load at the 15-minute level, this comparison reveals operational changes as a precise function of time of week. For example, comparison of two regression models can reveal exactly how scheduled load has changed on, say, weekday afternoons.

Not all buildings have a source of energy interval data available. In such cases, techniques may be used to extrapolate from available energy data, including monthly energy use and demand figures, to a more complete characterization of building energy use over time, which can then be used as input to other analytic techniques. Extrapolation may be based on techniques that compare the building in question to a peer set based on factors that may include, but are not limited to, building type, building location, building size, the ratio of energy use to energy demand, trends in building energy use over time, and other available building characteristics.

Pattern Recognition—Generally

Figure 15:
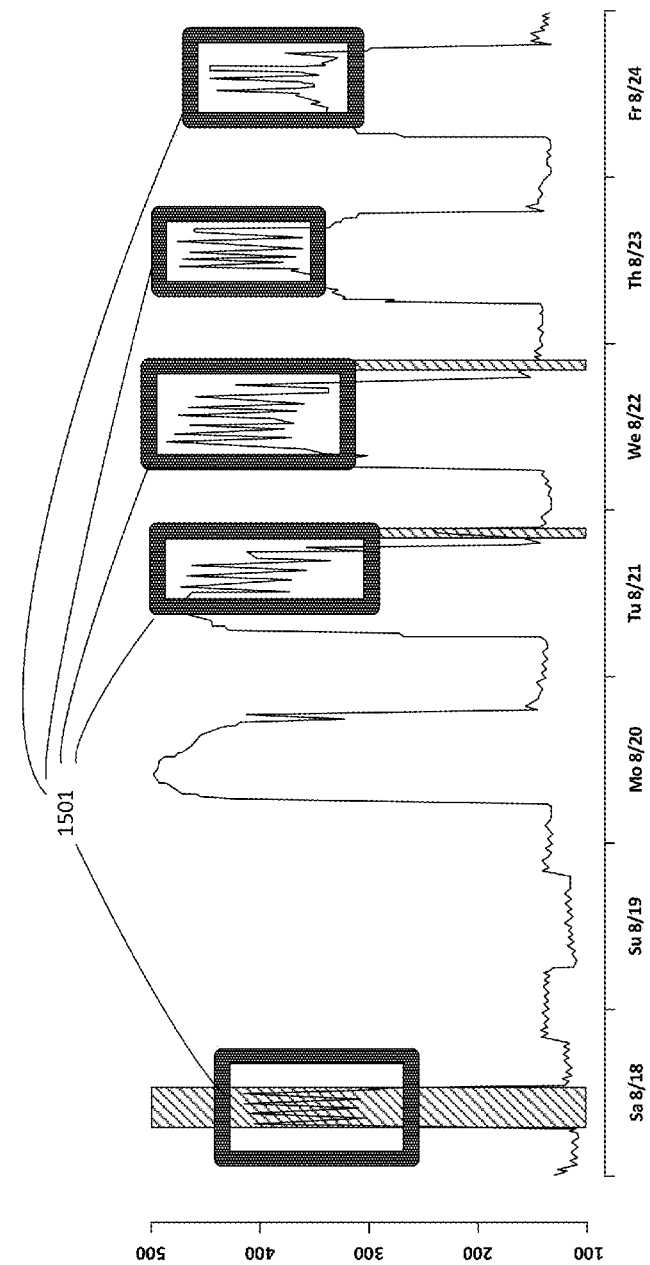
FIG. 15 is a plot depicting equipment cycling over time.

A pattern may generally refer to an abstract description of distinctive energy behavior detectable in an interval load curve. Some patterns, such as demand spikes or equipment cycling, may visible to the trained eye in a plot of building data, e.g. as depicted in FIG. 15. Other patterns may only be able to be detected via statistical analysis.

In certain embodiments, the system's pattern recognition analytics system performs the following functions: 1) Pattern identification: identifying the presence of pre-defined patterns in raw interval data. 2) Pattern reporting: generating end-user messages containing text and numerical summarizations of the pattern. 3) Pattern trend analysis: characterizing changes in the frequency and severity of pattern occurrence over time to aid in building operations management.

Figure 16:
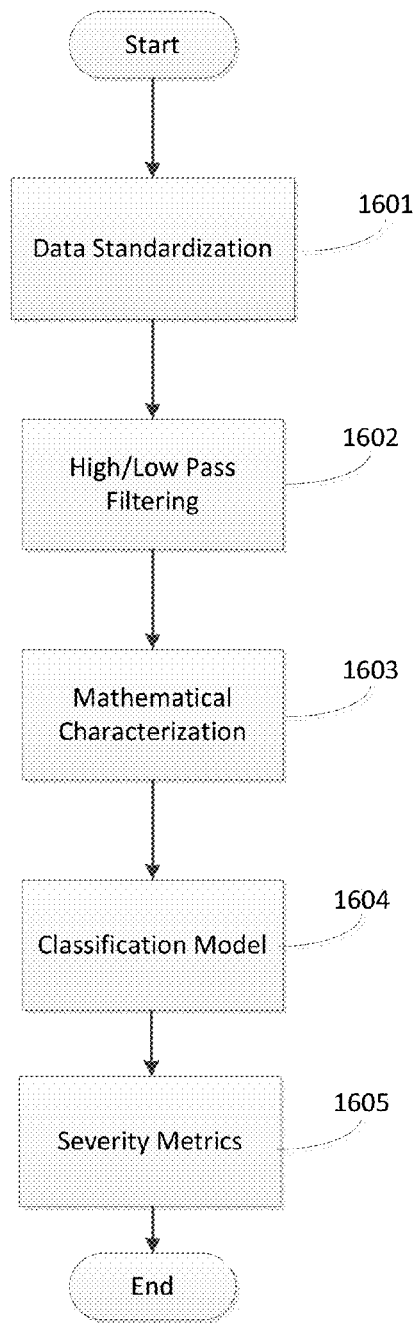
FIG. 16 is a process diagram generally depicting certain steps in a pattern recognition process as implemented in certain embodiments.

The pattern recognition process implemented in certain embodiments is generally outlined in FIG. 16. At step 1601, data is standardized for input into the pattern classification system. At step 1602, a high-pass or low-pass filter is applied to the data to help smooth extraneous features and help the features of interest stand out. At step 1603, the input data is mathematically characterized, transforming it from raw energy input into a higher-level description of energy use features. At step 1604, this higher-level characterization may then be classified according to the presence or absence of the pattern in question. Classification can be performed by a variety of techniques, ranging from rule-based systems to supervised machine-learning algorithms. At step 1605, a severity score is assigned to the classified pattern, allowing comparison of pattern events over times and across disparate meters.

Figure 17:
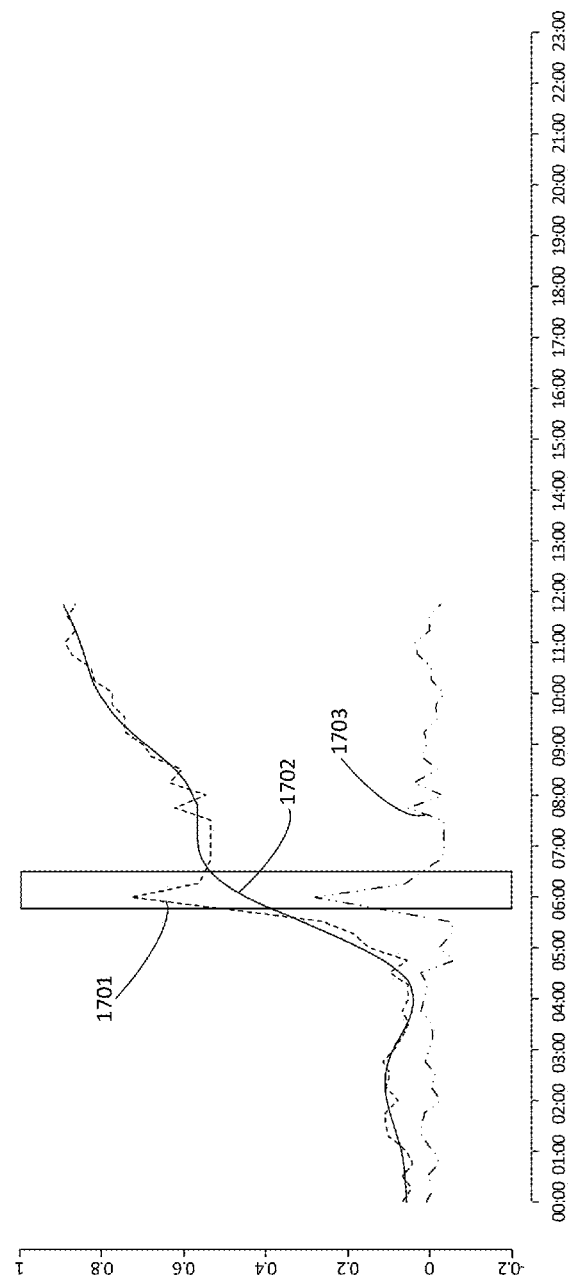
FIG. 17 is a plot of building energy use over time depicting an example of the "hard start" pattern.

Consider for the purposes of an example application of the process in FIG. 16, the "hard start" pattern depicted in FIG. 17. Raw interval data is here depicted in units of kilowatts (kW), and different buildings may have minimum and maximum kW values over widely different ranges. To allow different buildings to be compared and combined for purposes of creating an automated pattern recognition algorithm, kW values may be first mathematically transformed using the model-estimated baseload fact obtained from the certain embodiments' decomposition algorithm as follows:

Load index=[kW/(baseload)]−1

The line 1701 represents the derived load index. The time intervals exhibiting the hard start pattern are shaded grey.

Prior to mathematically characterizing a shape, it may be useful to first isolate the feature of interest—a sharply rising demand spike 1701—from larger shapes (the broadly rising morning curve) that may confound the algorithm. For the hard start pattern, the system may use a high pass filter constructed as follows: 1) Fit a smooth spline 1702 to the load index using GAM techniques. 2) Calculate the difference between the load index and the spline curve 1703. This value represents a high pass filtered time series from which the larger morning startup shape has been removed. The final filtered series isolates the peak between 5:30 and 6:30 from the larger morning startup shape.

The next stage of transformation can involve mathematically characterizing the shape of the high pass filtered series. The technique the system may use for this specific pattern is the Discrete Wavelet Transform. This algorithm converts the series of 48 numbers in the chart into a set of coefficients describing the frequency and time characteristics of a simple recurring shape in the series.

Subsequently, a supervised learning algorithm may be applied to create a classification model. The wavelet coefficients described above are computed for a sample of cases where the pattern has been visually identify to be present or absent by a human operator. A data set containing coded pattern values ("present", "absent") and the corresponding wavelet coefficients may then be input to a classification model, such as a Random Forest algorithm, a Support Vector Machine, or any other suitable method capable of generating predicted classification values from a set of numerical inputs. The output from this classification may be a set of classification coefficients.

The classification coefficients may then be applied to energy interval data where the pattern presence is unknown. Wavelet coefficients may be computed for these cases, and the classification coefficients may be applied to obtain the predicted pattern value ("present" or "absent"). A second classification model may be constructed in similar manner to determine which time intervals are involved in the pattern if it is predicted to be present.

It may also desirable to create a numerical measure of the magnitude ("severity") of a given predicted pattern. This may be a measure of excess demand relative to the case where the pattern does not occur. The smoothing techniques used in the high/low pass filtering process provides the basis for this comparison: in the case of a hard start the difference between the load index and the spline is the severity metric, multiplied by baseload to transform the value back to a kilowatt unit of measurement.

In other cases, the system may be interested in larger, longer-term shapes in the load curve rather than in more short-term phenomena. In such cases the system may use a low pass filter, such as a moving median, to remove short period features from the load curve and mathematically isolate the longer period features of interest. Once the data series has been filtered, a Bayesian Change Point (BCP) algorithm may be used to find statistically significant changes in level. This mathematical characterization algorithm facilitates distinguishing small random fluctuations in level from more meaningful statistically significant changes in level that may be attributed to changes in the buildings operating condition.

Figure 18:
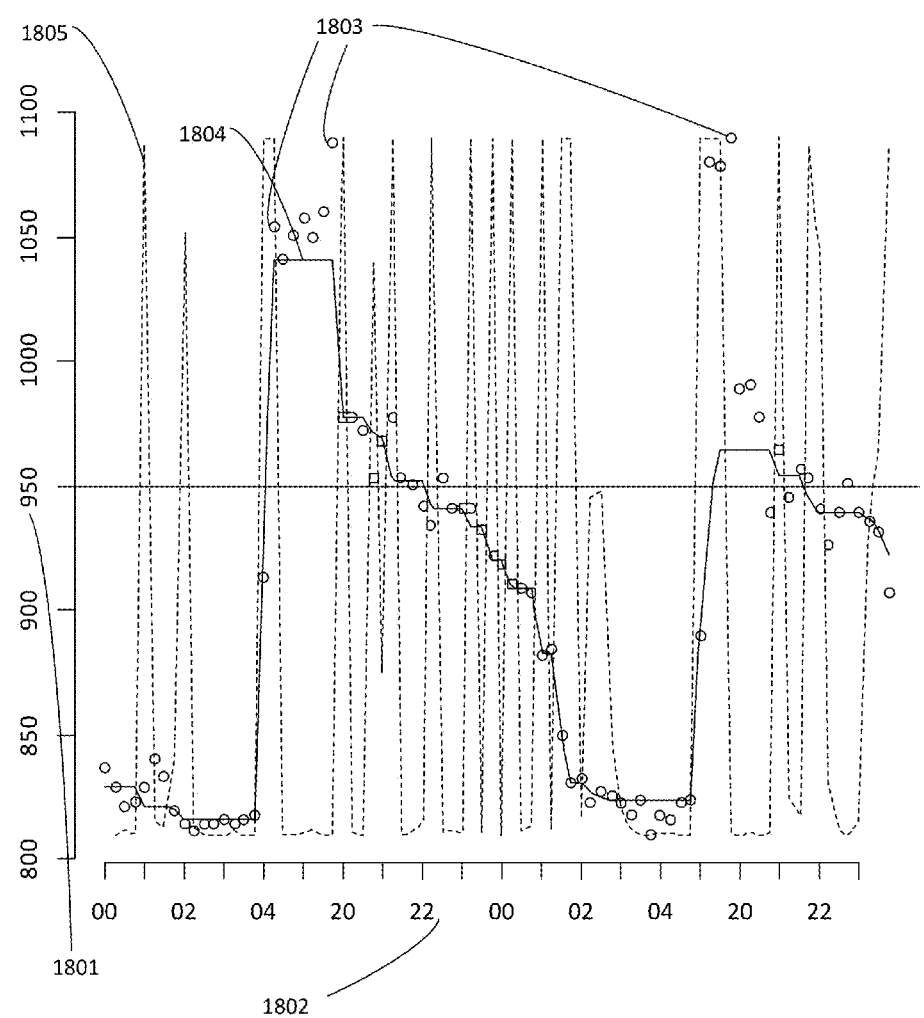
FIG. 18 is a plot of the results of a Bayesian Change Point analysis of an energy load curve.

FIG. 18 shows the result of a Bayesian Change Point analysis of an energy load curve. The horizontal axis 1802 shows the hour of the day; the left vertical axis 1801 represents demand levels in kilowatts. The circles 1803 plot individual demand values at each time interval. The line 1804 is the predicted kW level of the BCP algorithm. This analysis smoothes out random fluctuations in the raw input series and serves as a reference value for a given time period. The line 1805 represents the probability that a given time interval shows a level change with respect to the prior interval; a value exceeding the horizontal red line (50% probability) indicates a statistically significant change.

In this example, the system may determine periods of minimum nightly load by a rule-based classification model that identifies consecutive intervals between times showing statistically significantly higher levels than the observed minimum. Additionally, automated algorithms may determine building startup and shutdown times by using rule-based thresholds, or by using the Dynamic Time Warping technique to map an observed change point profile to a template with known startup and shutdown times. Finally, severity metrics are constructed to measure the length and magnitude of overnight levels above the local daily minimum (actual demand minus the minimum BCP predicted demand), as well as to compare the local daily minimum (predicted BCP demand) with respect to expected baseload levels (load decomposition baseload demand).

Similar techniques may be used to classify other patterns. For example, the equipment cycling pattern may first undergo data standardization via the load index method described above. Next, the system may construct a high pass filter by subtracting a moving median from the load index. The high pass filtered load index may be transformed using techniques designed to identify cyclical patterns in the data, including wavelet transforms, partial autocorrelation function transforms, and Fourier transformations. The transformed load index may be classified according to a model developer using supervised machine learning techniques described above. Finally, the system may compute a severity metric by calculating the sum of the absolute value of the load index minus the moving median and multiplying the result by the baseload.

To identify the energy spike pattern, the system may first create a load index as described above. The system may then construct a high pass filter by subtracting a moving median from the load index. No further mathematical transformation may be required, so the system may next classify the energy spike pattern using a simple rule-based threshold classification, e.g. pattern value="present" if the high pass filtered load index exceeds a constant value. Finally, the system may calculate the pattern severity by subtracting a moving median from the load index and multiplying the result by the baseload.

A pattern data point may generally refer to a timestamped value indicating the presence of a specific pattern type, along with supplementary pattern characteristics. For example, a pattern data point might indicate that the "demand spike" pattern was present on Jun. 5, 2012 at 23:15 with a value of 150 kW.

Pattern Recognition Behavior Overview

A "pattern event" may generally refer to a set of contiguous pattern data points that together form a discrete occurrence of the pattern. For example, four "demand spike" data points in a row describe an hour-long event that taken together may be recognized as an instance of a spike.

As described in greater detail below, pattern recognition algorithms allow certain embodiments to automatically detect energy events of interest to a facility manager or property manager. Some of these patterns, such as equipment cycling, may easily be visible to the naked eye in the shape of the load curve. Being visible to the naked eye, however, doesn't necessarily mean that patterns are easy for a machine to detect. In fact, even humans have difficulty with the many edge cases that tend to occur in noisy interval data, and false positives and false negatives are an issue for human-based and machine-based energy analysis alike.

Detecting a pattern, however, may only be the first step in the process of characterizing a signal and conveying the information to users. The simple presence or absence of a pattern is usually of far less interest than the overall context. Relevant inquires include: Is the pattern new, or part of a recurring series of events? Is the pattern growing better or worse over time? How bad is it? How concerned should the user be? When should the user be alerted to pattern status? When is information actionable vs. merely distracting?

Many of these determinations include subjective elements, but a machine must ultimately draw firm distinctions in some embodiments. Various embodiments contemplate a process for organizing, scoring, and presenting raw pattern data so that the system can make semantically meaningful recommendations to end users, as described below.

Deriving these sorts of insights automatically requires combining raw pattern data, time series analysis, rate information, and higher-level building knowledge to generate a consolidated set of recommendations. Note that the processing algorithms can be tuned to deliver different recommendations for different output media. For example, a daily event log on a web site can contain a fairly rich stream of ongoing event updates. A monthly paper-based bill stuffer will necessarily focus on the top one or two building issues. In both cases, the underlying raw pattern data may be the same, but different processing rules may be used to derive a final set of recommendations.

Figure 19:
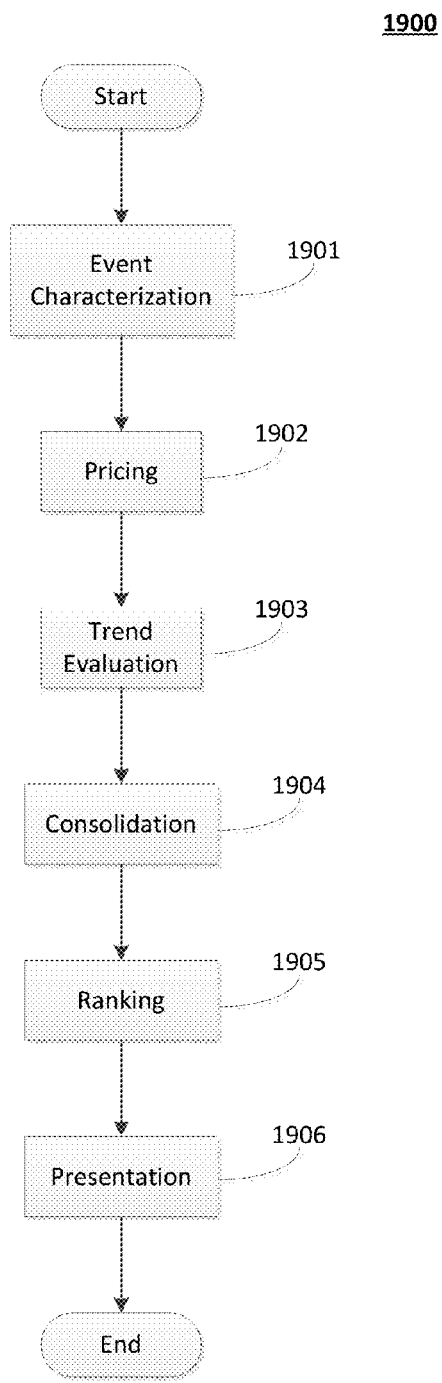
FIG. 19 is a flow diagram generally describing the high level features of the pattern recognition method of certain embodiments.

FIG. 19 depicts logical steps that may be used in certain embodiments to take pattern data from creation to presentment. At step 1901, the system may perform event characterization. Raw data may be summarized into discrete energy events with distinct attributes based on event type. At step 1902, the rate engine may be used to apply pricing data to each pattern event.

At step 1903, the system may perform trend evaluation. Time series analysis, for example, may be applied to determine the overall trend in energy events of a given type. Comparing different events over time may require scoring the events along one or more dimensions. The mechanisms for scoring events and for trend analysis may differ across pattern types. For example, energy spikes can be characterized by how frequently they occur, how much incremental demand they represent from base to peak, and by how much increment energy use they represent, a function of both demand and duration. Instances of equipment cycling can be characterized by frequency, duration, and the size of the demand swings.

At step 1904, the system may perform consolidation. During consolidation, discrete pattern events may be grouped together into a higher-level description that is more informative than communicating every single event individually.

At step 1905, the system may perform a ranking operation. User attention may be limited and so the system may make editorial decisions regarding the salience of pattern information. This is turn may require ranking the importance of events across different pattern types (e.g., is a spike more important than a hard start?). Ranking may also require incorporating feedback from the reporting process itself, e.g., users may not need to be reminded of events that they have recently seen.

At step 1906, the system may present the acquired information. All of the previous steps may result in a set of semantically rich structures that summarize and annotate the underlying event data. At step 1906 the system may render these data structures as output for the end user.

Pattern Recognition—Event Characterization

In certain embodiments, the first step in pattern interpretation is taking the raw pattern data points, annotating with supplementary information such as price, and summarizing them into pattern events. The output of the pattern recognition module may be a set of labeled pattern data points, each pattern data point may consist of one or more of the following: a timestamp; an indication of pattern type; an indication of pattern presence; a pattern code (an enumerated type, such as high or low); an indication of total demand (e.g. raw meter reading); an indication of pattern demand (e.g., incremental demand attributable to pattern—can be positive or negative). One will recognize that certain of these fields may be grouped together into one or more fields.

The pattern kW is the portion of demand attributable to the pattern itself. FIG. 20 provides one example of a single coded data point data structure 2000. In this example, the data point indicates that the meter shows 350 kW of demand at 8:45 AM on Dec. 1, 2012, and 150 kW of that demand is due to a severe needle spike. The surrounding series of points might look as follows:

TABLE 3

| Time | 08:30 | 08:45 | 09:00 | 09:15 | 09:30 |
|---|---|---|---|---|---|
| Pattern | spike | spike | spike | spike | spike |
| Presence | false | true | true | true | false |
| Code | N/A | severe | severe | severe | N/A |
| Total demand | 184 kW | 350 kW | 415 kW | 275 kW | 203 kW |
| Pattern demand | N/A | 150 kW | 215 kW | 75 kW | N/A |

The period in which the pattern is present occurs in the 8:45, 9:00, and 9:15 columns. Pattern presence values of "false" may be used to demarcate pattern boundaries, and are discarded when pattern data is summarized into events. Although in this example the pattern receives a code of "severe", many patterns are simply present or absent, and the pattern recognition algorithm may not further categorize them.

Pattern Recognition—Pattern Events

As indicated in step 1901, of FIG. 19, the first post-processing step may be to summarize a pattern event, rolling up the individual data points in the time series. Pattern events of any type may all share certain attributes: Pattern type; Pattern code; Start time; End time; Total kWh; Max kW; Min kW.

The attributes total kWh and max kW may refer specifically to the incremental use and demand associated with the event, the difference between actual demand and use and what would be expected in the absence of the pattern event. Demand and use values may also be negative. For example, kWh may be a cumulative measure, so a negative number indicates that over the duration of the pattern event, net use savings occur. For kW, on the other hand, min and max may refer to the smallest and largest incremental demand readings. For most patterns, the minimum or the maximum demand value may be the most interesting. For example, during an energy spike, the max demand value may tell the user everything they want to know about a demand spike. The minimum incremental demand, on the other hand, may occur at either the beginning or end of the event, when the spike is either on its upswing or petering out. This minimum reading may be arbitrarily close to zero and therefore less interesting to the user.

For some patterns, however, the minimum and maximum together may give the user a sense of the full amplitude of an energy swing. Equipment cycling and hard starts are examples. In addition to the universal attributes, specific pattern types may have unique event attributes corresponding to distinctive pattern features. For example, a hard start pattern may involve a demand spike, followed by a demand trough, followed by full building start-up. Salient facts that the system may want to summarize include the size of the initial spike, the amount of pullback during the trough period, and the subsequent demand level reached during full start-up. The relationship between these numbers may assist the system to characterize the pattern and possibly to diagnose its cause.

A cycling pattern may be characterized by both the amplitude of the demand cycle and also the frequency. Fully characterizing a pattern event's summary facts may be a necessary part of the deployment process.

Pattern Recognition—Pricing Pattern Events

As indicated in step 1902, of FIG. 19, there are a variety of ways to attach price information to a pattern event or a set of pattern events, some of which are described below. Although pricing is described here as an early step, the system may choose to price on the fly when pattern information is presented to end users.

Pattern Recognition—Pricing Pattern Events—Pricing Methods

Pricing pattern events may be difficult as the price depends on the question the system is trying to answer. For example, reasonable questions include: "What would the price of this event be if we assume it sets a new demand peak?"; "What is the price if it doesn't set a new demand peak?"; "Do we only care about the actual financial impact of the event, or do we care about its potential impact if it occurred on a different day or season?"; "How expensive is this event if it recurs regularly for the next year?"; "How expensive is it as a one-time occurrence?". Utility tariff pricing rules may be complex, and the assumptions layered into the pricing exercise may determine the result that will be achieved. The following sections describe several pricing strategies.

Pattern Recognition—Pricing Pattern Events—Pricing Methods—Pricing in Isolation

Some embodiments submit the load curve represented by the event's incremental demand values to the rate engine for pricing in isolation. Continuing the example above in Table 3, the demand values 150 kW, 215 kW, and 75 kW from the pattern would be submitted for pricing. Alternatively, several pattern events of the same type can be submitted for pricing together to gauge their cumulative impact. This cumulative approach may give a better picture of pattern costs, as demand charges may not be additive.

Pricing in isolation may not be the best practice for all circumstances. The price data associated with individual events may be highly influenced by possibly arbitrary features of the event, such as the exact time of day the event occurs. Shifting a spike by half an hour into a different time-of-use period, for example, might cut the spike's financial impact in half, potentially understating its urgency. Alternatively, a pattern event might happen to during a demand response event, inflating its one-time impact. Such dramatic fluctuations also raise questions about how to convert costs from individual events into annual figures. Energy demand may be volatile, and it might be more useful to provide longer-term averages to users than to show them every single up and down.

Pricing individual events in isolation may exaggerate the events' demand impact. For example, a 100-kW spike that occurs reliably at midnight is unlikely to carry a demand charge in real life, because it will be overshadowed by mid-afternoon demand. But pricing the spike in isolation, with the afternoon load curve removed, may make it appear fully additive to the building's demand charge.

Pattern demand values can be negative, and therefore impossible to price. Certain embodiments may workaround this issue, though, by pricing two different load curves and calculating the difference. For example, if the smallest pattern demand value is −100, then the system may add a 100-kW offset to every value, price the modified load curve, separately price a block of flat 100-kW demand, and then calculate the difference between the two.

Additionally, there are types of tariffs and tariff options for which a partial load curve calculation will yield potentially arbitrary results. This may be the case where absolute demand levels matter—for example, if a capacity reservation level applies. It may be possible to work around such issues by selectively modifying tariff options, or by adding a baseline of demand to avoid falling beneath certain thresholds, but these strategies add complexity and potential error into the calculation process.

Pattern Recognition—Pricing Pattern Events—Pricing Methods—Pricing in Context

Another pricing method is "Pricing in Context". This method may sidestep many of the problems involved with pricing in isolation. This method may compute a price for the meter's entire expected demand curve for the billing period. "Expected" in this case may not mean forecast for the future, but may instead refer to the model's historical output based on actual weather and other demand drivers.

Figure 21:
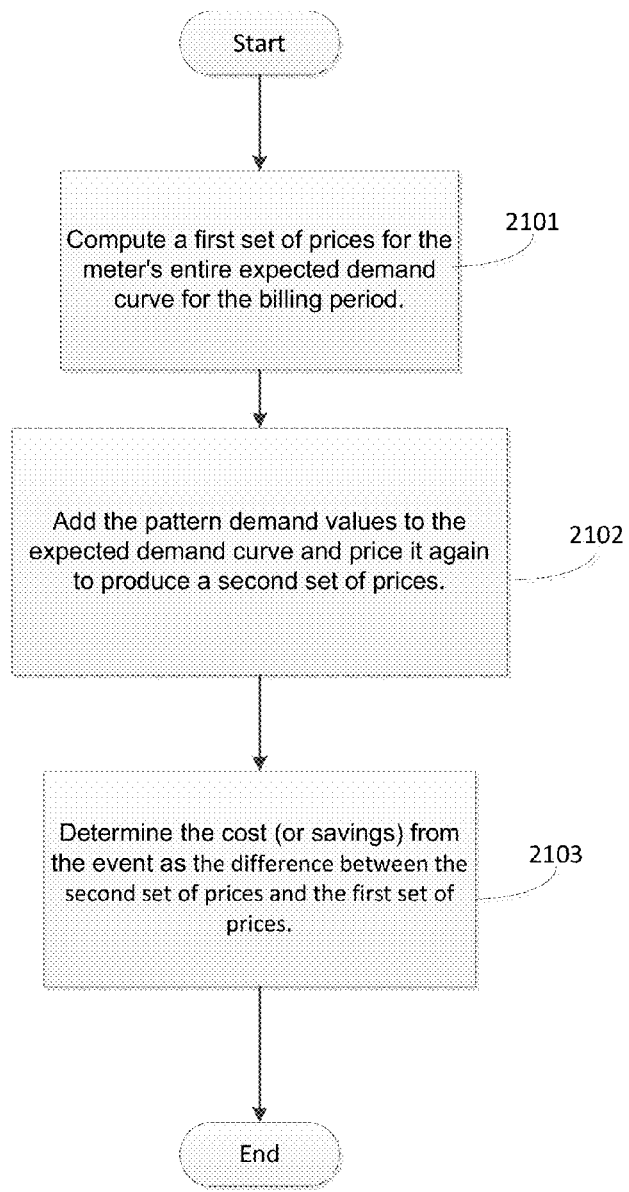
FIG. 21 provides an example of a pricing context method as may be implemented in certain embodiments.

An example of pricing in context is provided in FIG. 21. At step 2101, the system may compute a price for the meter's entire expected demand curve for a billing period. At step 2102, the system may add the pattern demand values to the expected demand curve and price the curve again. At step 2103, the system may determine that the difference between the second set of prices and the first set of prices represents the cost (or savings) from the event by subtracting the former from the latter.

This method may address several of the problems that may be associated with pricing in isolation. By pricing several events of a given type simultaneously, the system may smooth out volatility from demand fluctuation and timing effects, providing a more accurate picture of the long-term financial impact of an energy pattern.

By layering pattern events over the expected load curve, the system may understand the actual impact in the context of a building's typical behavior. This facilitates certain benefits, for example, to avoid ascribing demand costs to an event that will never actually be incremental to the building's peak demand. The system may calculate savings from negative demand values in addition to costs from positive ones.

Despite these advantages, pricing in context may also have disadvantages. In particular, the method may give a good sense of actual historical incremental demand costs, but may give a poor sense of potential future demand costs. For example, a small mid-day demand spike nine times out of ten may not cause any incremental costs, because it doesn't fall on a high-demand day. But on that tenth occasion, the spike may coincide with the building peak and drive up the demand charge. The isolated cost calculation method is good at revealing this potential cost impact, whereas the in-context cost calculation method may mask it.
Pattern Recognition—Pricing Pattern Events—Pricing Methods—Pricing Methods—Hypothetical Pricing Another pricing approach combines elements of the isolated and in-context pricing methods to facilitate more complex analysis. To perform hypothetical pricing, the incremental demand from a pattern event may be time-shifted to various points within the billing cycle to gauge hypothetical impact under different scenarios. For example, the system may move a mid-day spike to a billing cycle peak to determine potential impact on the demand charge. The appropriate time-shifting strategy is pattern-specific.
Pattern Recognition—Pricing Pattern Events—Pricing Methods—Pricing Methods—Combined Method As an initial pricing strategy, certain embodiments may compute two separate prices, one based on the isolated method, the other based on the in-context method. For the isolated approach, the system may create an artificial load curve consisting of entirely flat demand equal to peak demand for the meter. For example, if the peak demand reading during the billing cycle is 1,000 kW, the system may create a load curve that shows steady 1,000 kW throughout the entire billing cycle. The system may price this curve and then add the pattern demand values to this curve and price it again. The system may then calculate the difference between the two curves to derive the incremental cost of the pattern in isolation.

Figure 22:
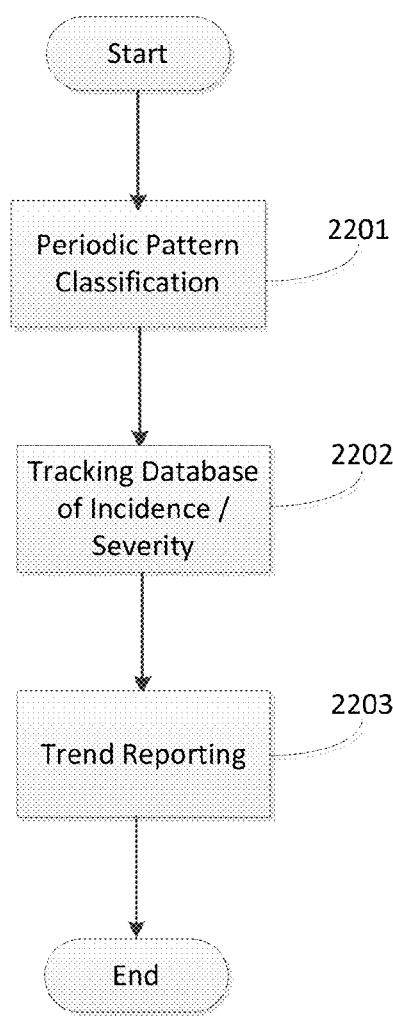
FIG. 22 is a process diagram depicting various steps in pattern trend evaluation as implemented in certain embodiments.

For the in-context approach, the system may proceed in a similar manner to the isolated approach, but may use the model's expected values for the billing period rather than using a flat curve as the baseline.
Pattern Recognition—Trend Evaluation As indicated in step 1903, of FIG. 19, once pattern data points have been summarized into pattern events, the system may then perform trend evaluation and detect larger-scale patterns across individual events. Pattern trend evaluation as implemented in certain embodiments is generally depicted in FIG. 22.

The first step in trend evaluation may be pattern identification and/or classification at step 2201. The pattern identification processes described above are run on a periodic basis (e.g., weekly) and pattern identification results may be stored in a database at step 2202. The result may be a time series of pattern presence and severity metrics. This database supports rigorous analysis of incidence and severity metrics over different periods of time and across buildings.

Statistical tests of significance are applied to pattern frequency and severity metrics to identify changes in these metrics (year over year, quarter over quarter, etc.) and may be regularly reported to the end user at step 2203. Exceptional values—an increase in frequency or severity for example—are identified using these statistical tests and passed to an alert messaging system for more immediate end user notification.

The time series pattern data also supports sophisticated statistical analyses to detect seasonal changes or trending in pattern frequency/severity such as repeated measures analysis of covariance. Additionally, cross-building analyses in the context of managing a portfolio of buildings or normative analyses of performance relative to peers are performed using analysis of variance modeling techniques. Exploratory statistical techniques, such as cluster analysis, are used to uncover broader patterns across buildings useful for utility applications.
Pattern Recognition—Trend Evaluation—Characterizing Pattern Events.

Pattern events may be complex, multivariate phenomena that can trend in opposing directions along different dimensions simultaneously. For example: spikes can become simultaneously more severe (bigger) and also less frequent; cycling events can become shorter in duration but feature more severe swings; and elevated nighttime baseload can become longer in duration but lower in incremental demand.

In certain embodiments, the system may track trends along two independent dimensions: time and severity. There are at least two ways of characterizing time trends. Which measure makes more sense may depend primarily on whether pattern events are best regarded as discrete or continuous. Under the "frequency" approach, the system may count the number of discrete events per time period. For example, a meter might display 5 spikes per week. Under the "duration" approach, the system may calculate the total percentage of time in which a pattern is present. For example, a meter might display an elevated baseload for 8% of its readings.

Severity is a score that may be used to summarize pattern strength. Severity may generally be an artificial metric that collapses several pattern features down into a single number for easy comparison across events. Calculation methodology depends on the pattern, and it may make sense to scale the severity score so that all patterns range in severity from 0 (not present) to 100 (maximally present). For example, an energy spike could be assigned a severity score by dividing the spike's incremental demand by the max demand for the billing cycle. Scaling scores may make it easier to compare pattern severity across meters and also across pattern types.
Pattern Recognition—Trend Evaluation—Characterizing Trend Certain embodiments categorize patterns as having six possible trend values: New; Ongoing; Increasing; Decreasing; Resolved; and Recurred. Not all of these values will be applicable to all patterns. In particular, if a pattern lacks any concept of severity, it might not make sense to think of the pattern as worsening or improving, rather than as simply being present or absent. The following table provides one example system for categorizing trends based on these values.

TABLE 4

| Trend | Interpretation |
| --- | --- |
| New | Pattern occurred; was formerly present only sporadically or not at all |
| Ongoing | Time and severity trends either constant or moving in opposite directions. |
| Increasing | One dimension grows while the other holds constant or also grows |

TABLE 4-continued

| Trend | Interpretation |
|---|---|
| Decreasing | One dimension decreases while the other holds constant or also decrease |
| Resolved | Pattern is no longer present |
| Recurred | Pattern had been resolved, but is now present again |

Note that these trend states are deliberately value-neutral so that they can apply just as well to "good" patterns, meaning patterns that a user may want to encourage. A positive pattern that is increasing in frequency or severity can be said to be increasing overall—that is, having an even more positive impact.

Pattern Recognition—Trend Evaluation—Determining Trend

Trend detection can be difficult in sparse or volatile data sets. If a pattern only occurs once every few weeks, or if pattern events are highly volatile, patterns that appear to be trends may actually be spurious. Certain embodiments contemplate at least two possible methods for dealing with noisy or sparse data.

In the first approach, the system treats any shifts in pattern values as real and reports the noise. If spikes are more frequent this month than the previous month, the system makes note of the fact, regardless of whether the movement is statistically significant. This strategy considers that any changes in pattern severity are of potential interest to facility managers, who may be better equipped than an algorithm to decide whether the shift reflects random noise, some external driver such as weather, or a true operational change.

In the second approach, the system may report only shifts that pass a bar for statistical significance. This may mean that in many cases the system may report issues as ongoing.

Pattern Recognition—Trend Evaluation—Related Considerations

Certain embodiments choose a relevant timeframe over which movements should be tracked and reported. These timeframes may be week-to-week, billing-cycle-to-billing-cycle, quarter-to-quarter, etc. The answer may vary across patterns—some may be short-lived, while others represent fundamental aspects of building behavior. Certain embodiments will start at the month level as a starting point as this is the billing period.

Pattern Recognition—Consolidation

As indicated at step 1904 of FIG. 19, individual pattern events may be consolidated into a single multi-event record. For example, if five energy spikes occur in a single day, it may be more informative and more convenient to alert the user to a series of repeating spikes that occurred throughout the day rather than to report each one individually.

In certain embodiments, consolidation can happen across different time spans, which may be relevant to different output media. For example, a paper bill stuffer may need to consolidate events across an entire billing cycle, while a weekly email report may instead need to consolidate over the course of a week.

It may be difficult to consolidate events into a meaningful summary. For example, the results of an analysis may be presented as: 1) "You experienced 7 energy spikes last week"; 2) "Energy spikes occurred every night last week between 12 am and 2 pm"; and 3) "This meter experiences energy spikes most days of the week, usually in the early morning". Version 1 may be the easiest summary to generate, but the least informative. Version 2 may be far more informative, but relies on very regular pattern behavior. Version 3 may be flexible enough to characterize data that has some associated noise.

Further, consolidation may be pattern-specific. For example, compare the following: "You experienced a hard start every day last week"; "You experienced nearly continuous equipment cycling throughout the week"; "You experienced a hard start on Tuesday and Friday last week"; and "You experienced sporadic cycling on Monday". Consolidation occurs by applying a series of sequential rules for matching pattern characteristics. The rules proceed from the more specific to the less specific, and the first match is used as the descriptor for the consolidated pattern. For example, if a spike occurs on Saturdays only, then the more-specific descriptor "You experience equipment spikes on Saturdays" will apply. If spikes occur on Saturdays and Sundays, then the slightly-more-general descriptor "You experience equipment spikes on weekends" will apply. Likewise, heuristics are applied to determine frequency descriptors such as "always", "frequent", "occasional", and "sporadic". For example, a pattern that appears on between 35% and 95% of days might be referred to as "frequent". The number of descriptors and the exact breakpoints can be adjusted on a per-pattern basis to fine-tune the output. The purpose of this consolidation is to turn a large set of raw pattern event data into a higher-level qualitative summary of building behavior that property managers can incorporate into their planning cycles.

Hard starts may be discrete events, whereas cycling may be continuous, and strategies for consolidating events may generally differ across pattern types. Certain embodiments apply different strategies for different event types as described below.

Pattern Recognition—Consolidation—Daily Events

Daily events can be characterized by three consolidated characteristics: frequency, start time, and end time. Although daily events may only happen once per 24-hour time period, this doesn't mean they are constrained to individual calendar days. High baseload, for example, is a daily event that often spans midnight. For purposes of characterizing daily events as belonging to weekdays or weekends, certain embodiments use the day in which the event begins. So, for example, the night beginning Friday evening and stretching to Saturday morning may be considered a weeknight by the system.

The following table shows different values and their definition for the frequency characteristic across different consolidation time spans. The frequency values in this example are overlapping (e.g., values of "Every Monday" and "Occasional" could both apply to the consolidated data), and in such cases this embodiment always selects the more precise characterization ("Every Monday").

TABLE 5

| Frequency | Monthly consolidation | Weekly consolidation | Daily consolidation |
|---|---|---|---|
| Daily | 85+% of days, both weekday and weekend | Every day | N/A |
| Most days | 50+% of days, both weekend and weekday | 4-6 days, both weekday and weekend | N/A |
| All weekdays | 85+% of weekdays, no weekends | Every weekday, no weekends | N/A |

TABLE 5-continued

| Frequency | Monthly consolidation | Weekly consolidation | Daily consolidation |
|---|---|---|---|
| Most weekdays | 50+% of weekdays, no weekends | 3-4 weekdays, no weekends | N/A |
| Every weekend day | 100% of weekend days, no weekdays | 2 weekend days, no weekdays | N/A |
| Most weekend days | 50+% of weekend days, no weekdays | N/A | N/A |
| Every <day of week> | 100% of specific day of week, no other days | N/A | N/A |
| Most <day of week> | 50+% of specific day of week, no other days | N/A | N/A |
| Frequent | 25+% of days, both weekday and weekend | N/A | N/A |
| Occasional | 2-6 days | 2 days | N/A |
| Once | 1 day | 1 day | 1 day |

In some embodiments, start and end times aren't enumerated values. Instead, the system may characterize start and end times by a series of values, e.g.: Number of occurrences of the event; Mean start or end time; percentage of occurrences falling within +/−15 minutes of the mean time; percentage of occurrences falling within +/−30 minutes of the mean time; percentage of occurrences falling within +/−60 minutes of the mean time; percentage of occurrences falling within +/−120 minutes of the mean time; etc.

Pattern Recognition—Ranking

As indicated at step 1905 of FIG. 19, ranking provides a solution to a user's limited attention span. Limits to user attention and constraints of various output media may restrict the amount of pattern event data that can conveyed to end users.

Certain embodiments use algorithms that rank all the issues according to salience to decide which patterns and events to report. Ranking algorithms of certain embodiments are capable of comparing across pattern types to derive a single list of priority-sorted issues.

In certain embodiments, ranking will occur for each output medium. For example, a paper bill stuffer will highlight a different set of issues than a web feed. In general ranking algorithms flag urgent items and avoid nagging the user. If a meter suddenly displays an odd behavior that has never been observed before, the system may want to bring this to the user's attention, even if the behavior isn't (yet) very expensive. Conversely, if some incredibly expensive energy event occurs, the system may mention the event, even if the issue in question is fairly mundane. In short, the ranking algorithm would preferably not bury highly salient information in the ongoing data stream, though this may always occur to a certain degree.

With regard to nagging, the ranking algorithm should acknowledge that many issues in buildings are chronic and have become part of the building structure. Even if a building suffers a brutal hard start problem, a ranking algorithm may not necessarily need to sound the alarm in every single report.

Pattern Recognition—Ranking—Inputs to the Ranking Algorithm

There are a variety of possible inputs to a ranking algorithm. Inputs may need to be scaled and/or normalized to prevent any single input from completely dominating the ranking algorithm, and to normalize effects across meters with differing absolute levels of demand. Certain inputs that may be considered in various embodiments include: cost; severity; importance; urgency; and freshness.

Cost has several benefits, including that: cost can be compared meaningfully across patterns; cost can be summed or averaged across events; cost can be scaled relative to total bill or to other patterns. Certain embodiments contemplate a variety of methods for determining the scaling and normalization of cost. Some embodiments may scale the total monthly bill. Scaling the monthly bill may give a true sense of how material the cost impacts are to the user. $100 on top of a $1,000 bill may matter a lot more than $100 on top of a $100,000 bill. Some embodiments may scale cost relative to other patterns. Both scaling to the monthly bill and scaling to other patterns may preserve the relative standing of the various pattern events. However, scaling to a total bill might diminish or inflate the relevance of cost as a factor relative to other inputs to the ranking algorithm. Scaling pattern costs to other pattern costs may make it much more likely that the cost input will cover a standard range.

With regard to severity, severity as discussed in this section may be identical to the severity metric used to perform trend analysis. Generally, more severe issues may receive a higher ranking. Although severity may sometimes be confounded with cost, severity is useful measure for patterns that don't involve a cost component. Severity suffers from the problem of inconsistency across pattern types.

With regard to importance, importance is a fixed factor determined on per-pattern basis to increase the weight of certain patterns based on a subjective evaluation of their urgency. For example, system implementers may determine that, regardless of the low associated cost, demand spikes deserve more attention than, say, early starts. In certain embodiments, this subjective weighting into account by assigning this pattern a higher importance value.

With regard to urgency, urgency may correlate with changes in trend. Patterns with a status of "new" may generally be far more urgent than ones with a pattern of "ongoing" as new patterns represent shifts in building operations that may require immediate attention, as opposed to longstanding issues that are probably well known to the facilities staff. The following trend values which may be used in some embodiments are listed in order of descending urgency: New; Recurred; Increasing; Decreasing; Resolved; Ongoing. In certain embodiments, the progression in urgency may not be continuous.

With regard to freshness, freshness may refer to how long it has been since a user last received a notification about a specific pattern. If repeated recent warnings have been sent out, then certain embodiments may consider the information to be stale. On the other hand, if it has been a long time since users last received an update, the information may be regarded as fresh. Various embodiments contemplate calculating freshness in different ways. A sigmoid function may offer the ideal behavior for representing freshness: slow growth in freshness immediately after a new notification, followed by accelerating growth further away from the last notification, followed by a plateau. The plateau ensures that the freshness metric doesn't keep rising indefinitely and come to dominate the ranking algorithm. In some embodiments, the system could assign a point scale based on the duration of time since the last notification was sent.

Pattern Recognition—Presentation

As indicated at step 1906 of FIG. 19, certain embodiments may present pattern event information to users via a variety of channels. Certain embodiments may provide reports that contain a short list of pattern events that occurred in the preceding weeks. The system may use a website to present a fuller feed of day-by-day pattern events.

Figure 23A:
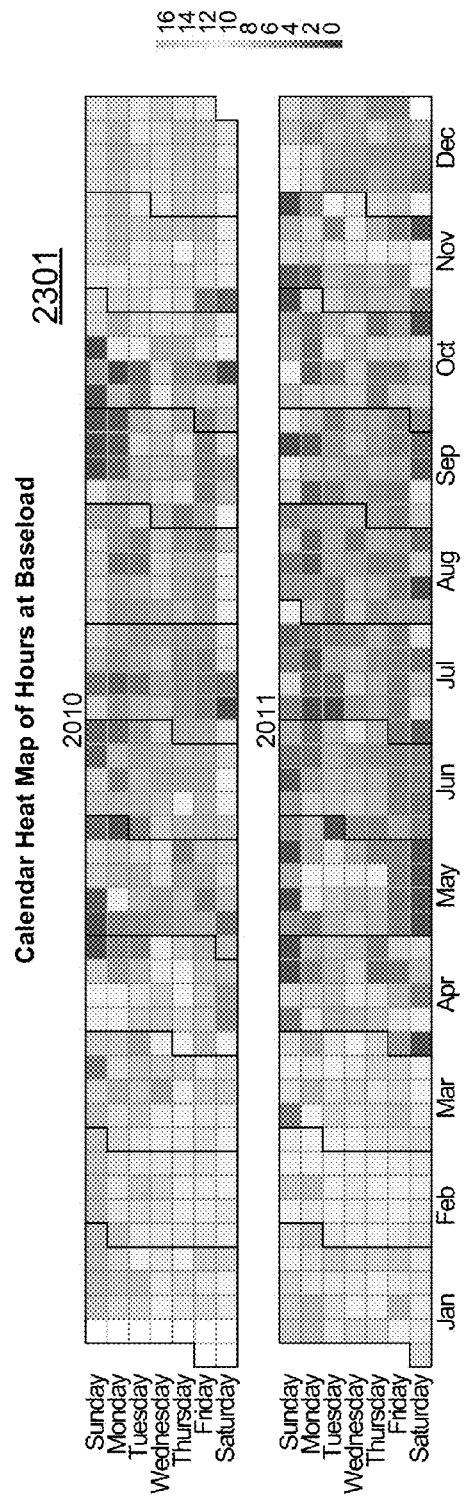
FIGS. 23A-C depict calendar-based heat maps of a building as may be generated in certain embodiments.
Figure 23B:
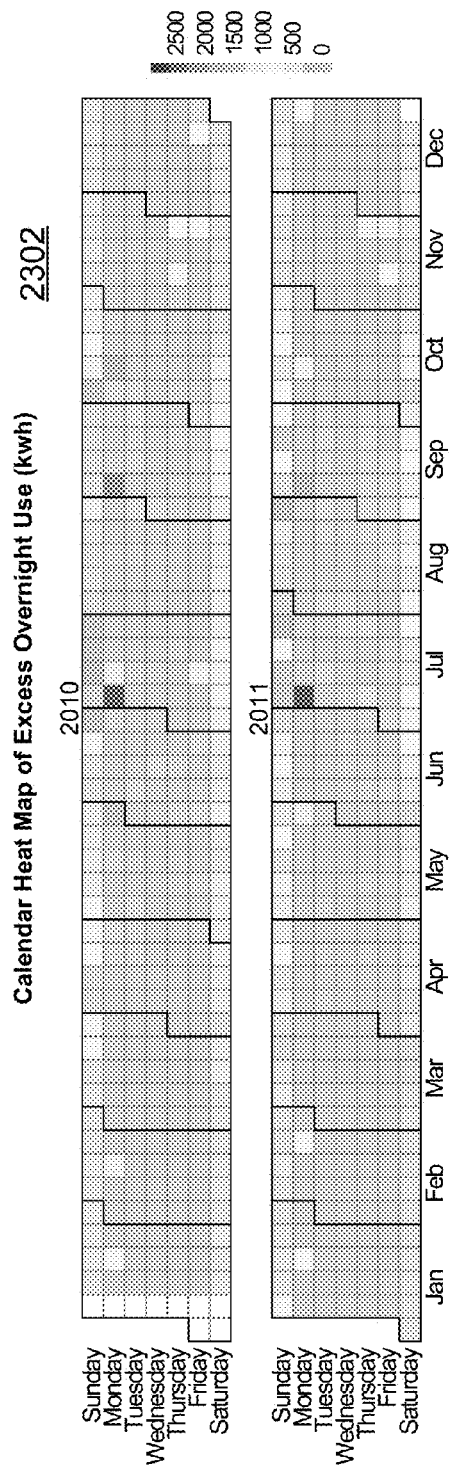
Figure 23C:
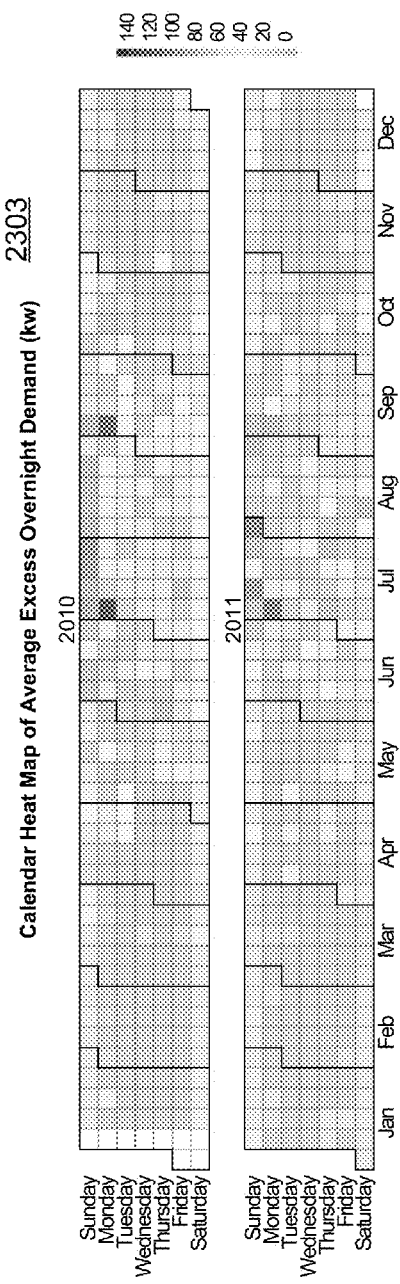

In some embodiments, the severity score assigned to pattern events can be scaled and represented in a calendar-based heat map, such as the ones depicted in FIGS. 23A-C. The first heat map 2301 in FIG. 23A shows the number of hours of full shutdown each night over two years. Shorter periods of full shutdown are highlighted in red, to indicate a possible failure mode in the building. The second heat map 2302 in FIG. 23B is an alternative view of the same issue, plotted using a different severity metric: the cumulative excess energy use (in kWh) due to incomplete overnight shutdown. The third heat map 2303 in FIG. 23C provides another view using a third severity metric: average excess overnight demand (in kW). In some embodiments, the system can calculate alternative severity metrics or combine severity metrics and display them in calendar-based tools or alternative views to give users different ways to identify faults or trends.

Figure 24A:
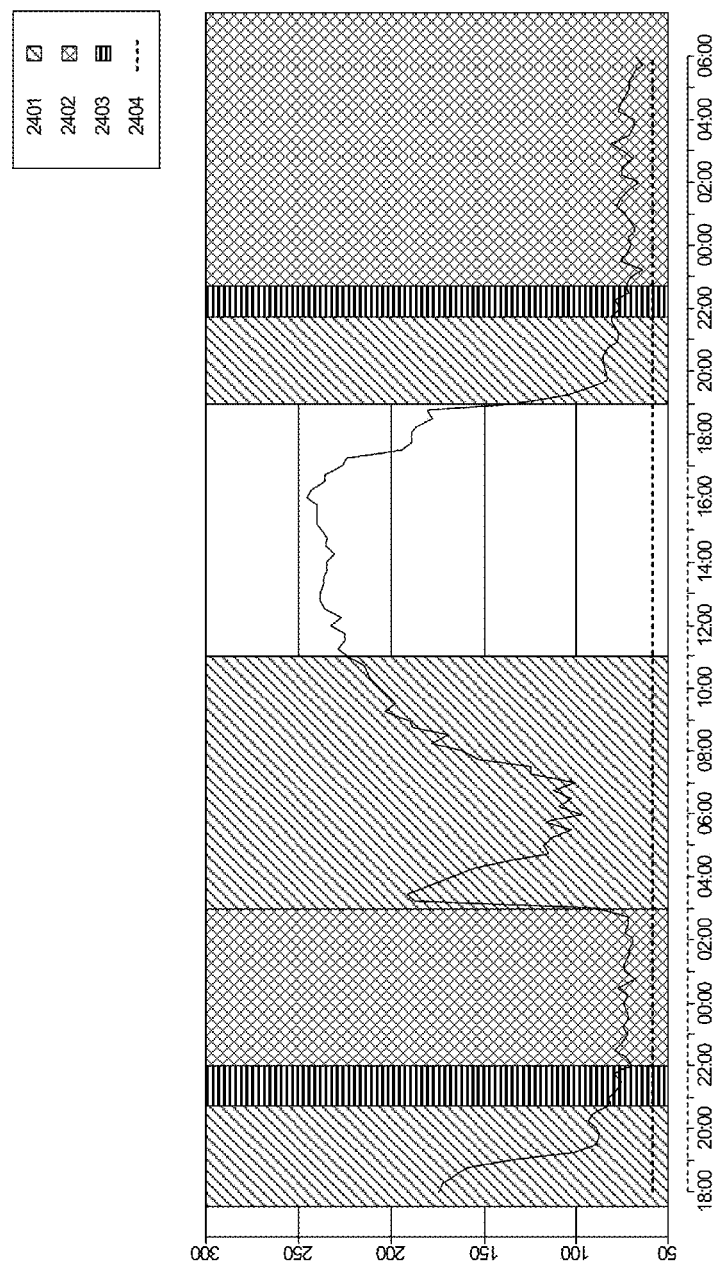
FIGS. 24A-B illustrate energy load curves overlaid with pattern information as may be implemented in certain embodiments.
Figure 24B:
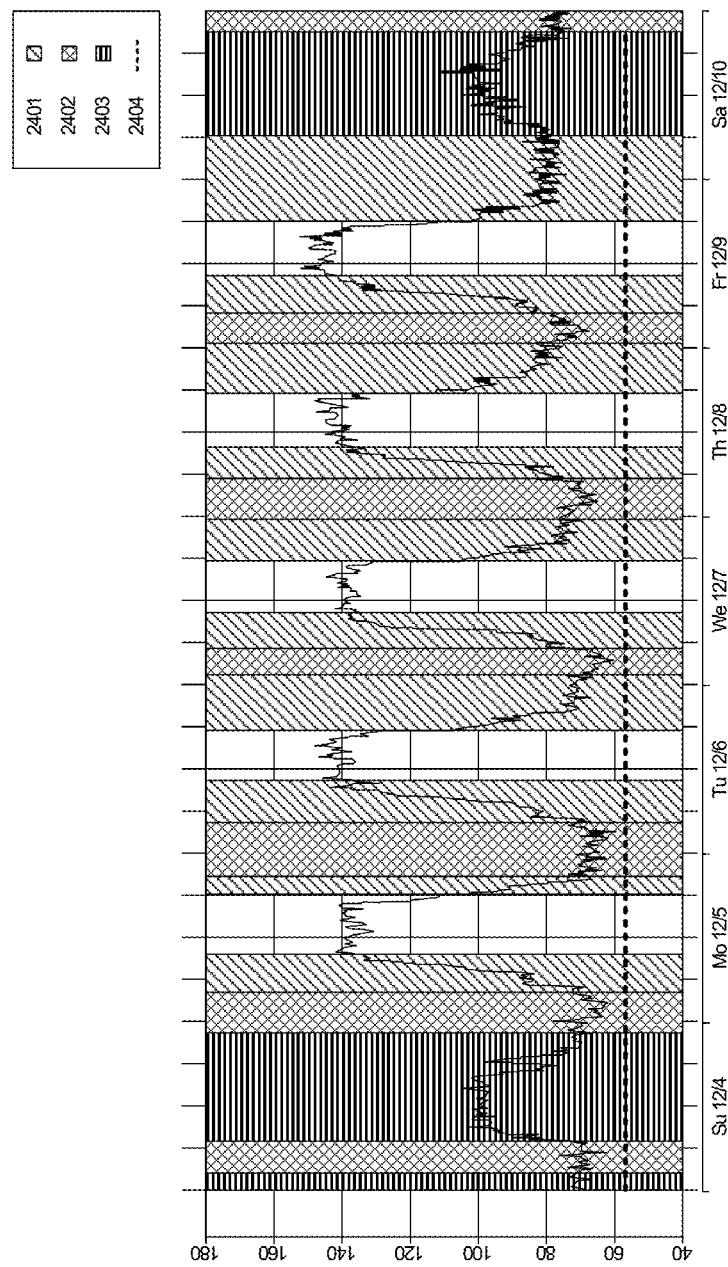

In some embodiments, users might be able to overlay an energy load curve with a complete set of pattern data. A small handful of pattern events might be selected on a monthly basis as highlights on a paper insert in a monthly utility bill. Certain embodiments may provide a structured feed that includes raw event data as well as consolidated event data. FIGS. 24A-B show energy load curves overlaid with pattern information. In the illustrated example, Bayesian Change Point analysis was used to identify changes in demand levels. These raw pattern data points were then summarized into pattern events, which are indicated in the areas 2401-2403 on the load curves. Areas 2401 represent periods of building startup and shutdown. Areas 2402 represent periods of minimum nightly and weekend demand. Areas 2403 represent elevated off-hours use. The horizontal line 2404 represents the statistically derived true minimum baseload, which can be used to derive a severity score for periods of off-hours use.

In some embodiments, summary views such as the heat maps depicted in FIGS. 23A-C are linked directly to load curves such as the annotated graphs depicted in FIGS. 24A-B, allowing users to browse summaries of pattern events over large data sets and then drill down into specific instances of those pattern events. For example, the Bayesian Change Point analysis used to characterize building startup and shutdown in FIGS. 24A-B may be used to calculate a severity score for early startup events over time (with earlier startups being more severe), and the results displayed in a heat map as depicted in FIG. 23A-C. Users can then survey the early startup event data from several years at a time and drill down to individual instances.

These channels may differ along several dimensions, such as density, richness, and format. With regard to density, episodic reports may carry only a few highlights, whereas load charts may convey large volumes of time-series information in compact form. With regard to richness, although load charts may convey large amounts of historical pattern information at once, generally that information may be limited simply to the presence or absence of a specific pattern at a specific point in time. Written reports, on the other hand, can only convey much deeper contextual information, such as pricing, trend, etc. With regard to format, pattern events can be described or summarized in a variety of manners, such as rich text, as a timeline, as a table, etc. The current implementation includes a set of weekly reports that include from 3-6 highlighted messages conveying pattern or energy event information. The current implementation also includes an interactive energy load charge that incorporates a directly overlay of pattern event data.

When generating content for each of the potential output media the output may be based on the processing describe here, in which at the lowest level pattern data points are taken and then consolidated, priced, plotted over time, rolled up, and finally ranked, resulting in a set of semantically rich data structures that can be plugged into a presentation layers and presented to end users in the most convenient way possible.

Automated Energy Pattern Recognition and Fault Detection

In some embodiments, the system may present the data in the form of an energy load curve. The shape of an energy load curve may reveal detailed information about building operational management practices and equipment behavior. In certain embodiments of the platform system, the pattern recognition capability may employ a set of time series feature isolation techniques designed to remove extraneous patterns from the data. These techniques may be used to create a mathematical representation of the load curve details of interest. These mathematical representations may then be used as input to an inference engine to, e.g., derive facts about building operations and equipment; identify possible faults in equipment or building control sequences; identify one-time problems or energy management events; identify operational improvements and energy efficiency gains; and identify energy efficiency opportunities.

In certain embodiments the pattern recognition algorithms categorize each time-stamped input energy data value according to the presence or absence of specific patterns of interest. For example, an energy spike may be characterized as a brief, sharp rise in demand followed immediately by a fall-off in demand to the earlier base level. Spikes may be defined as short in duration, typically lasting for approximately an hour. A pattern recognition algorithm designed to detect spikes will annotate energy interval data points according to the presence or absence of a spike pattern. For example, if a spike occurs between 1:00 AM and 2:00 AM, the algorithm may mark the data points at 1:00 AM, 1:15 PM, 1:30 PM, and 1:45 PM as having a spike present.

In certain embodiments, the pattern recognition algorithms may further categorize energy patterns beyond simple presence or absence. For example, a pattern might be ABSENT, MODERATE, or SEVERE. Following raw pattern recognition, the output of the pattern recognition algorithms may be further summarized into events that can take on additional descriptive values. For example, the contiguous energy data points flagged by the spike detection algorithm above can be grouped into an ENERGY SPIKE event with a start time, end time, and total peak value in kilowatts.

Certain embodiments' pattern recognition algorithms may detect state transitions in energy use, rather than discrete events. For example, a shutdown detection algorithm can detect when a building has closed for the evening by looking for characteristic load shapes. Certain embodiments' pattern recognition algorithms may characterize building energy use against a baseline reference, which can be derived either from the building itself or from a suitable set of peer buildings. For example, a building startup time might shift from day to day. Any individual startup event may be unremarkable in isolation, but taken together the startup events may reveal a possible opportunity to improve energy efficiency. Benchmarking pattern recognition algorithms characterize shifts, instability, or variations from established norms.

Where appropriate, the output of the various pattern recognition algorithms may be further categorized via time series analysis. For example, some trend detection algorithms characterize pattern output as NEW, ONGOING, INCREASING, DECREASING, RESOLVED, or RECURRED. A series of energy spikes that are growing more frequent over time would be classified as INCREASING. Energy events are often multivariate; they can, for example, vary in frequency, duration, and severity. Therefore, trend evaluation may require resolving possible conflicting variables using pattern-specific heuristics.

Certain embodiments' time series analysis can also detect regularities in energy event occurrences. For example, some buildings have elevated baseload on weeknights only. Some buildings experience demand spikes on Monday mornings, because the HVAC systems are struggling to meet cooling needs after a weekend of disuse. The platform system's time series analysis may detect regular patterns, including time-of-day effects, day-of-week effects, and weekend vs. weekday effects.

Certain embodiments' time series analysis may include analysis of energy event frequency. Infrequent issues may be more meaningful than frequent ones, because they may represent operational changes or equipment failures. The output of the pattern recognition algorithms may be used as input to a utility rate engine that assigns a cost to the energy event. Costs may be calculated in several different ways, as appropriate to the underlying pattern.

The actual cost of the energy event may be characterized as the incremental charge associated with any excess energy use that took place during the event. For example, the cost of an energy spike may be the cost of the energy demand in excess of the baseline.

Often it is useful to examine the hypothetical cost of an energy event if it had occurred at a different time. For example, energy spikes are relatively inexpensive if they don't cause a billing cycle demand peak to be set, but they can be extraordinarily expensive if they do cause a billing cycle peak. To help energy managers prioritize issues, it may be useful to time shift events to determine their potential impact on bills.

It may also be useful to determine annualized costs for a recurring energy event to determine the long-term financial impact. Because utility tariffs often include seasonal rate adjustments, computing an accurate annualized cost may require projecting out two hypothetical year-long load curves, one with the energy event in question and one without, and comparing the cost of each.

Taken together, energy event data and ensuing analysis of trend, frequency, and cost can be used in certain embodiments to assign a priority to individual issues and events. More expensive issues may be given higher priority than less expensive issues. Likewise, new or worsening events may have higher priority than old or improving ones.

Priority information can be used to tailor presentation to end users based on information channel. For example, extremely high priority issues could trigger a text message to a facility manager. Lower-priority, higher-frequency issues can be viewed as a web-based feed. Very high-frequency issues can be visualized directly on an interactive energy load chart. The system platform of various embodiments makes energy event and priority information available in a structured way, so that presentation can be tailored as appropriate.

In some embodiments, pattern output may be used as input to a natural language engine that describes events in terms familiar to facility managers. Pattern analysis may be applied on an ongoing or retrospective basis. Retrospective analysis may be used, for example, by retrocommissioning firms to summarize energy management issues in a building as a precursor to performing an audit. Ongoing analysis may be used by facility managers directly or by engineering services firms to monitor whole-building energy use on a daily basis to detect issues and trends as they occur.

Example patterns detected in certain embodiments may include:

Hard start. An energy spike followed by a drop-off at building startup, caused when large building systems come online.

Cycling. A periodic rise and fall in energy use, usually caused by setpoints that cause a piece of equipment to bounce rapidly back and forth within the limits of operating range.

Energy spike. Brief pronounced rise in demand followed by a drop-off to the previous baseline.

Weekend setpoint. A characteristic daytime rise in weekend energy use that indicates a temperature setpoint is being maintained even though a building is unoccupied.

High weekday baseload. A pattern in which the minimum demand level on weekday nights is higher than the minimum demand level on weekends, indicating the building is not completely shutting down.

Slow shutdown. A pattern in which a building takes a long time to reach the nightly minimum demand level after normal operating hours.

Early startup. A pattern in which building energy demand rises well in advance of normal operating hours.

Erratic baseload. A pattern in which the nightly minimum demand level fluctuates from day to day, indicating incomplete shutdown.

Daytime demand shifts. A pattern in which a large piece of equipment coming online, such as a chiller, causes a significant, prolonged jump in demand level.

Lack of afternoon coasting. A pattern in which a building's HVAC systems are run at full levels all the way through normal operating hours, rather than ramping down in anticipation of evening shutdown.

Incomplete holiday shutdown. A pattern in which a building shuts down partially but incompletely on special event days, such as federal holidays.

Example pattern recognition output, combining trend analysis and cost analysis may include the following: "This building takes a long time to reach baseload on weeknights. Reaching baseload one hour earlier will save $556 annually"; "This building experienced a hard start on Wednesday. This is hard on equipment and can cause excess demand charges"; "The building experienced an energy spike at 3:45 pm on Wednesday that caused a demand peak for the billing cycle. You will pay $1,123 in excess demand charges this month"; "This building experiences occasional equipment cycling on weeknights. The cycling has grown more frequent and severe over the past three months"; "The elevated baseload in this building has been resolved. Nice job! Reduced baseload will save you $10,345 annually"; "Last Monday was July 4. The building appears to have been partially occupied. If this was not the case, adjust equipment schedules to save during future holidays"; "Building start time shifted an hour earlier this week. If permanent, this change will cost $2,200 annually"; "Over the course of the past year, this building experienced sporadic energy spikes, at a rate of about five per month. Spikes were typically around 50 kW, and most occurred on weekday nights."

Certain embodiments apply GAM coefficients to the interval data to create a load decomposition, that is, an estimate of the proportions of the total load attributable to various factors such as weather, time of day, and nominal baseload for the building; Certain embodiments employ low pass filters derived from GAM decomposition terms, particularly baseload, to identify changes in baseload over longer periods of time; Certain embodiments use discrete wavelet decomposition, Fourier analysis, and statistical time series methods (Box-Jenkins) to mathematically characterize time domain patterns such as equipment cycling and the start-up profile of a building; Some embodiments use BCP analysis to identify transition points in the interval data that indicate features such as building startup and shut down, and the time intervals when a building is at its point of minimal load during off-hours.

Figure 25:
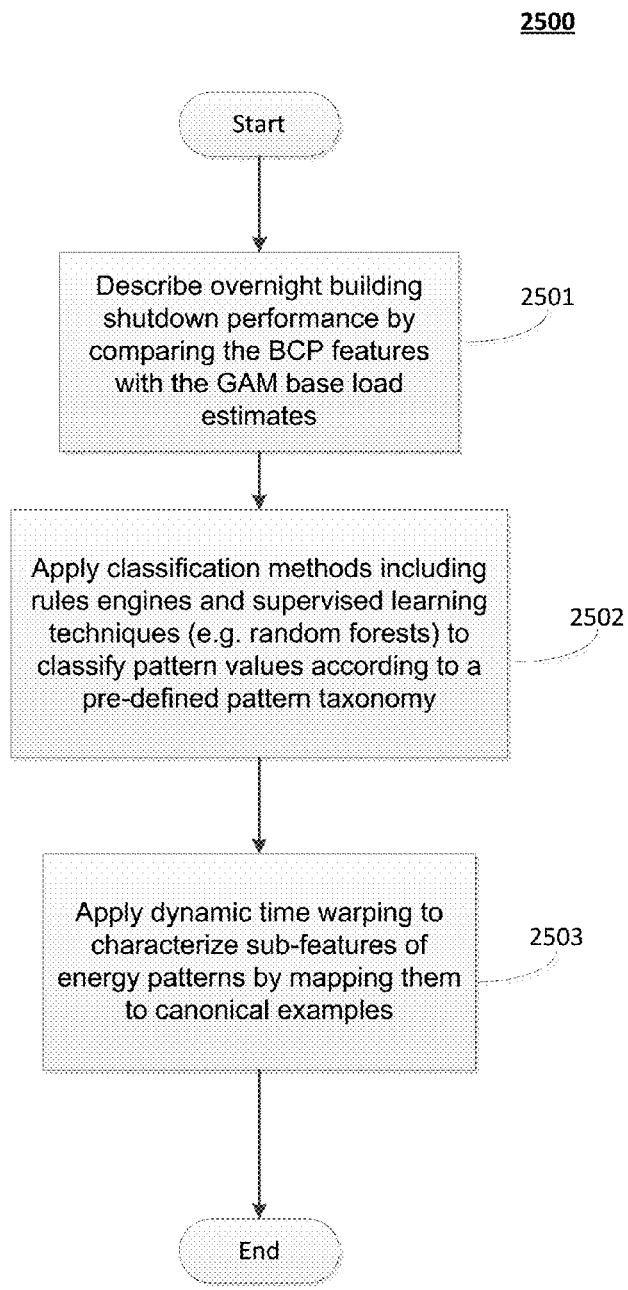
FIG. 25 is a flow diagram depicting how features may be compiled and used as inputs to classification engines designed to create end-user pattern classifications and descriptions.

The mathematical description of features described above may then be compiled and used as inputs to classification engines designed to create end-user pattern classifications and descriptions. For example, with reference to the example process of FIG. 25. At step 2501, the system may describe overnight building shutdown performance by comparing the BCP features with the GAM baseload estimates. At step 2502, the system may use classification methods including rules engines and supervised learning techniques (e.g. random forests) to classify pattern values according to a pre-defined pattern taxonomy. At step 2503, the system may apply Dynamic Time Warping to characterize sub-features of energy patterns by mapping them to canonical examples. This process is described in greater detail below with reference to FIGS. 11 and 12.

Automated Fault Detection Method—Initial Fault Condition Training

Figure 26:
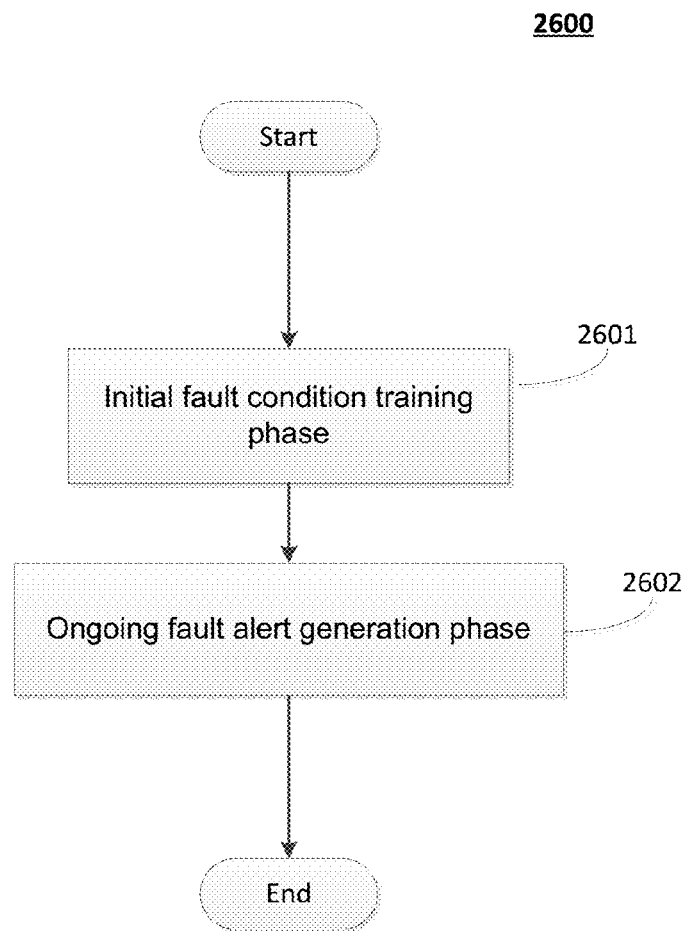
FIG. 26 depicts the phases of a fault condition operation as implemented in certain embodiments.
Figure 27:
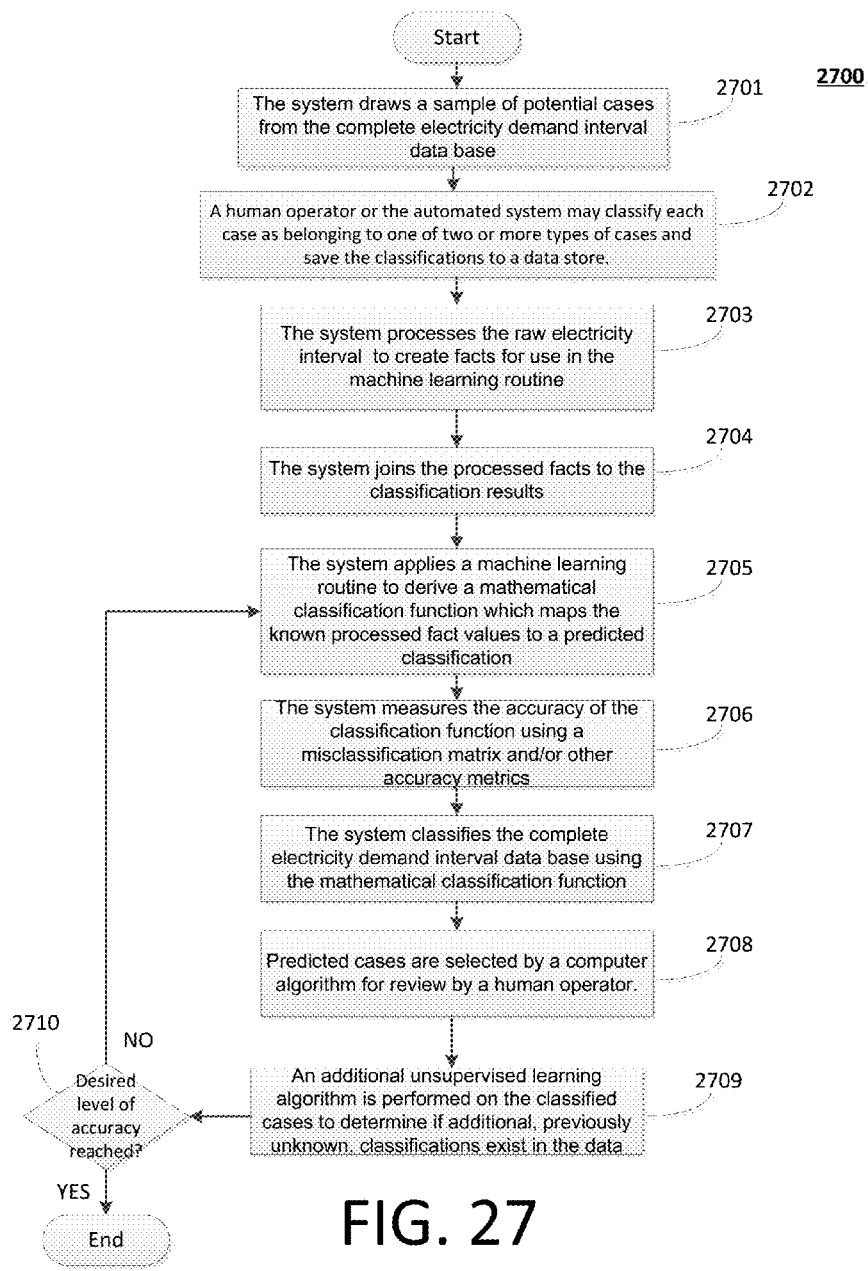
FIG. 27 depicts the fault condition training process implemented in certain embodiments.
Figure 28:
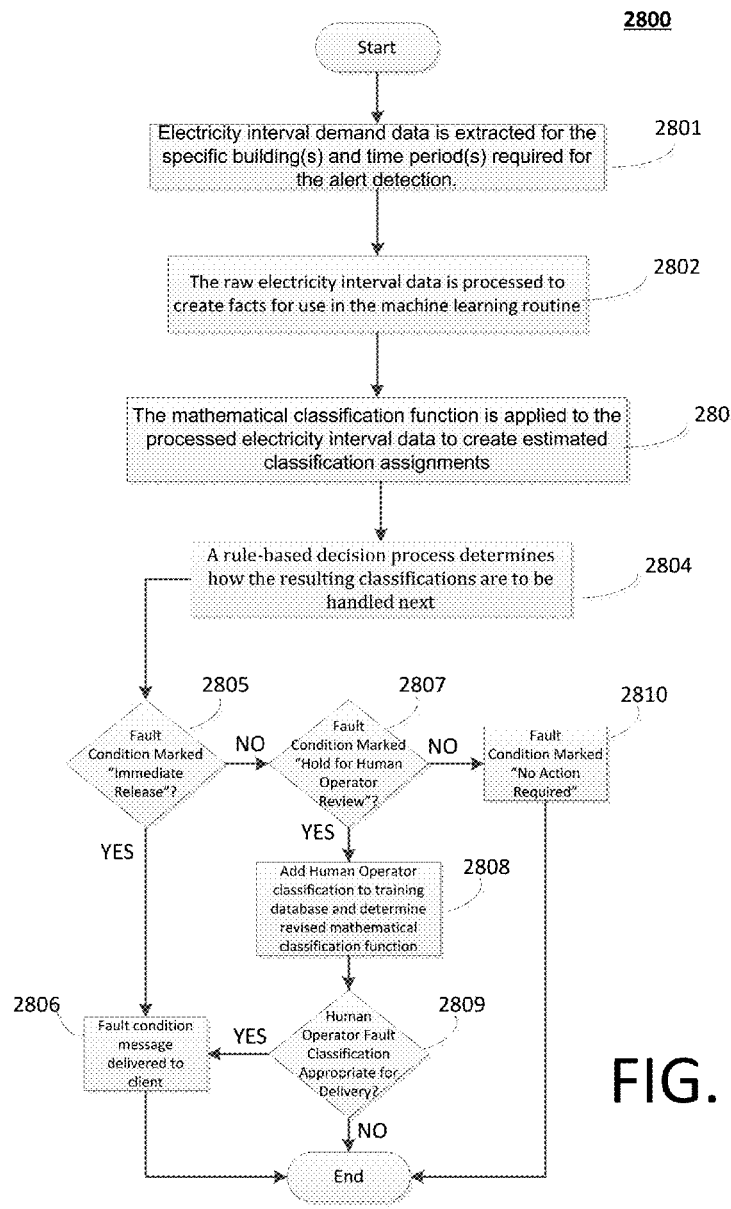
FIG. 28 depicts an ongoing fault alert generation process implemented in certain embodiments.

FIG. 26 depicts the phases of a fault condition operation as implemented in certain embodiments. In some embodiments, the initial fault condition training process 2601 may be performed once for each new type of fault condition to be predicted. The process is generally depicted in FIG. 27. The system may subsequently enter an ongoing fault alert generation phase 2602 discussed in greater detail below with reference to FIG. 28.

Beginning with the training process 2700, at step 2701 the system may draw a sample of potential cases from the complete electricity demand interval database. At step 2702 a human operator of the automated system may classify each case as belonging to one or two or more types of cases and save the classifications to a data store. At step 2703, the raw electricity interval data may be processed to create input data for use in the machine learning routine. Examples of the types of processing useful for this purpose may include but are not limited to: Dynamic Time Warping, Wavelet transformations, Discrete Fourier Transformations, Distribution moment statistics, Regression Model-based coefficients.

Dynamic Time Warping may refer to a technique measuring the distance between pairs of patterns and provides a mapping function useful in the determination of key event times. Wavelet or Discrete Fourier Transformations may be used to reduce a large number of raw values to a smaller number of terms describing the shape of the pattern. Distribution moment statistics (e.g. means, standard deviations, etc.) may be useful in describing the statistical distribution of the pattern.

Regression Model-based coefficients may be used to isolate features adjusted for other extraneous effects. For example, a load curve pattern may be decomposed into components representing: Temperature effects; Time of Day; and Trend.

At step 2704, the system may join the processed facts to the classification results. At step 2705, the system may apply a machine learning routine may then be used to derive a mathematical classification function which maps the known processed fact values to a predicted classification. Examples of machine learning techniques which may be applicable to the creation of this mathematical classification function include but are not limited to: Logic-Based Methods such as Decision Tree Learning; Support Vector Machines; Bayesian Methods; and Ensemble Methods such as Random Forests. At step 2706, the system may measure the accuracy of the classification function using a misclassification matrix and other accuracy metrics. At step 2707, the complete electricity demand interval database may now be classified using the mathematical classification function. At step 2708, the predicted cases may be selected by a computer algorithm for review by a human operator. The review cases may be selected using rule-based criteria including: Classification types considered to be less accurate, that is, more likely to be subject to classification errors as determined by the results of the misclassification matrix and other accuracy metrics; and Classification types considered to be more sensitive to errors. For example, some fault condition misclassifications may result in higher end-user business costs. A random sampling of all classification types may additionally be presented to the human operator to ensure that a quality assessment of all classification types is performed. The human operator may flag each classification result as either "correct" or "incorrect", and assigns the correct classification to each "incorrect" case".

At step 2709, an additional unsupervised learning algorithm may be performed on the classified cases to determine if additional, previously unknown classifications exist in the data. This process may be referred to as "clustering", and can be used to identify previously unidentified fault patterns in the electricity demand data.

At decision block 2710 the system or a user may determine whether a desired level of accuracy has been reached. If a desired level has been reached, the system may end. If a desired level has not been reached, the process may continue from step 2705 and repeat the estimation of the mathematical classification function, using possibly the original training cases, predicted cases reviewed by a human operator and classified as "correct", and/or predicted cases reviewed by a human operator and marked as "incorrect". The correct assignments may be provided by the human operator and used as input to the machine learning algorithm. Additional cases may be classified by a human operator as a result of examination of the unsupervised learning routine in step 2709.

Automated Fault Detection Method—Ongoing Fault Alert Generation

In some embodiments, the ongoing fault alert generation process may be performed each time a particular fault condition alert is to be produced. There may be multiple fault reporting cycles, determined by the type of fault condition, the client, or other factors. The process is generally described in FIG. 28.

At step 2801, electricity interval demand data is extracted for the specific building(s) and time period(s) required for the alert detection. The raw electricity interval data is processed to create the input facts required by the mathematical classification routine in step 2802. In step 2803, the mathematical classification function is applied to the processed electricity interval data to create estimated classification assignments.

At step 2804, a rule-based decision process may determine how the resulting classifications are to be handled next. These rules may consider the type of classification, the misclassification metrics determined for the mathematical classification function, and other pertinent factors. Following rules classification, the system may mark the fault condition for one of several categories of further action. In the example depicted in FIG. 28, the categories in this example include "Immediate Release", "Hold for Human Operator Review", and "No Action Required".

If at step 2805, the system determines that the fault condition is marked "immediate release" then the system may forward the fault condition to the client at step 2806. Fault conditions identified by the mathematical classification function and considered ready for immediate release to the client may be passed to an alert generation system to create and deliver a fault condition message to the client.

If instead at step 2806, the system determines that the fault condition is marked "hold for human operator review", the system may forward the fault condition to a human operator for classification. Fault conditions identified using mathematical classification functions with poor misclassification metrics, high business costs for false positive alerts, or other factors as codified in the rule-based process may be held for review by a human operator. All cases reviewed by a human operator are added to the training case database, and a revised mathematical classification function is then estimated, as indicated at step 2808.

If the human operator determines the fault classification is correct, they may release the alert to the alert generation system to create a fault delivery condition message to the client. As indicated by block 2809, if the human operator determines that the fault condition classification is incorrect, they may manually re-classify the case. Depending upon the resulting manual classification value, an alert may then be sent to the alert generation system (if appropriate) or the case is stopped from further action.

As indicated by step 2810, if the block is marked "No action required" the fault condition may not be processed further.

Building Drift Analysis

The operational behavior of many buildings may drift over time with the normal wear and tear of their control systems. Control sequences may change in ways that have unpredictable effects; equipment may fail or go out of calibration; occupants may engage in unexpected behavior; etc. The net effect of these factors may be for the energy use to climb unless the use is actively managed. Building drift is often hard to detect, though, as it may be obscured by the large variability driven by weather and seasonable fluctuations.

Various embodiments contemplate the construction of a statistical model of building energy use that considers weather as a predictive variable. Certain of these embodiments may apply GAM coefficients to the interval data to create a load decomposition, that is, an estimate of the proportions of the total load attributable to various factors such as weather, time of day, and nominal baseload for the building.

By removing the weather-driven energy component from the model's output, these embodiments may characterize shifts in a building's behavior with the effects of weather removed. Superimposing weather-normalized load curves from the same building at different periods of times may provide a visual demonstration of building drift at discrete increments, e.g., at the 15-minute level.

In addition to creating visualizations of building drift, certain embodiments characterize building drift algorithmically by summarizing the drift according to time-of-day and day-of-week effects. For example, summary analysis may reveal that a building is reliably using 100 kW of excess energy every weekday between 5 AM and 6 AM, a clear indication of a change in startup behavior. Such analysis may be performed by identifying periods that account for a disproportionate percentage of the difference in energy use between the superimposed load curves. Alternatively, energy use from analogous time periods on different days (such as the time between 1 AM and 2 AM on every weekday) can be summed to identify daily patterns.

Budgeting

Long-term energy budgeting may be confounded by the fact that a large proportion of energy use can be driven by weather, which is both variable and unpredictable. Various embodiments employ a technique for automatically generating long-term energy budgets. In certain embodiments the system generates a long-term budget by first creating a regression-based model of building energy use as a function of weather, based on historical energy and weather data. The model is used to project energy use into the future, and the resulting energy load curve is submitted to the rate engine for pricing, creating a long-term budget forecast.

Various embodiments create a statistical model of building energy use using weather as a predictive variable. These embodiments may also use historical weather data to create a weather probability distribution local to the building whose long-term budget is being forecast. The long-term weather forecast may be used as an input to the energy model to generate a long-term energy forecast.

The long-term weather probability distribution may be used to create a budget forecast at various confidence intervals, corresponding to various weather scenarios. For example, budgets can be prepared at the 10%, 50%, and 90% levels, indicating the probability that actual expenses will be the same or lower than forecast expenses. Because energy expenses generally rise with extreme temperatures (either very hot or very cold), these scenarios may represent mild, typical, and extreme weather. In some embodiments, confidence levels can be chosen automatically or adjusted based upon user input. The long-term weather forecast and weather confidence interval is created as described previously for long-term demand forecasting.

In addition to weather, building energy use may be affected by long-term trends, such as seasonality or occupancy changes. Various embodiment's time series analysis may detect and characterizes trends in building energy use. The system may then automatically forecast the long-term trend into the future, or present options to the user to allow user discretion over long-term trend forecasting. Options for projecting into the future may include, but are not limited to: straight-line trend projection; trend held constant; and cyclical trend projection. Straight-line trend projections anticipate that if there is a pronounced long-term trend that the model characterizes as approximately linear, it can be extended into the future, within some constraints (for example, energy use should not drop below zero). Projections with trend held constant may anticipate that if a trend seems to have stabilized in recent months, the most conservative assumption is often that no further long-term drift in building energy use will occur. Cyclical trend projections anticipate that some buildings, such as schools, exhibit a clear seasonality that can be projected into the future. In some cases, cyclical trends and linear trends can both be superimposed, as in the case of a building that exhibits seasonality and also steady long-term growth in energy load.

Figure 29:
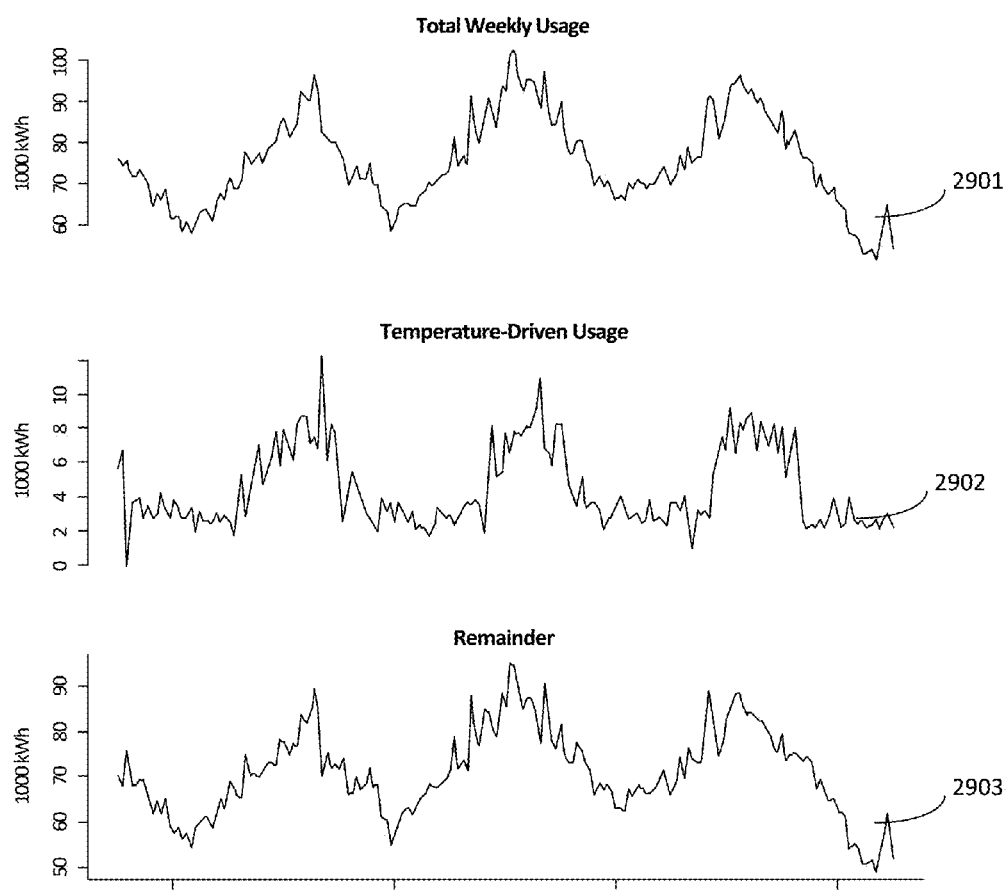
FIG. 29 illustrates a series of plots depicting long-term trend detection as may occur in certain embodiments.

FIG. 29 illustrates long-term trend detection as may be implemented in certain embodiments. The top chart 2901 shows total weekly energy use over a three-year period. The middle chart 2902 shows estimated temperature-driven use, as determined by a load decomposition regression model.

The bottom chart 2903 shows the remainder when temperature-drive use is subtracted from total use. The remainder shows clear seasonality, with baseline energy use growing in summer and declining in winter.

In certain embodiments the system may characterize these trends using statistical time series techniques, for example ARIMA or state space models. This approach may assume that seasonal patterns and trends are persistent and may be reliably forecast through the evaluation period. This approach unburdens facility managers from additional collection of data around energy use drivers, e.g. occupancy, and may provide extremely robust models. Projections of baseline energy trends are useful both in long-term budgeting and in measuring the effects of energy efficiency measures, as described in greater detail below. Users may have advanced knowledge of operational, occupancy-related, or equipment-related changes that will affect future energy use. Therefore, certain embodiments allow users to optionally apply arbitrary percentage adjustments to energy forecasts. Once the energy forecast is finalized, it may be fed into the system's rate engine. The rate engine may apply utility tariff logic, including future anticipated rate increases, to generate a long-term monthly budget.

On an ongoing basis, actual energy expenditures may be compared to budgeted energy expenditures, to forecasted energy expenditures, or to previous years' energy expenditures to drive a variance analysis. Using the same energy modeling technique used to derive the energy forecast, certain embodiments ascribe variance to root causes: weather-related variance (i.e., variance that occurs because weather differs from the forecast used to drive the budget); operational variances (i.e., variance that occurs because the building behaves differently than the model expects based on past building behavior); and rate variance (i.e., variance due to changes in utility billing practices). Variances may be positive or negative.

Facility managers may often want to understand year-on-year budget variance. The same analytic technique presented above may be used to decompose year-on-year variance into weather-drive, operational, and rate-driven components. In some embodiments, operational variance can further be characterized by performing building drift analysis to determine at what time of week or day variances are most commonly occurring.

Certain embodiments' models provide a rolling reforecast on an ongoing basis. By updating the model based on recent building behavior and integrating the more accurate near-term weather forecasts, these embodiments can provide a rolling update for the current month and current year indicating how likely the user is to hit their budget and where the variance is coming from.

Measurement and Verification

Figure 30:
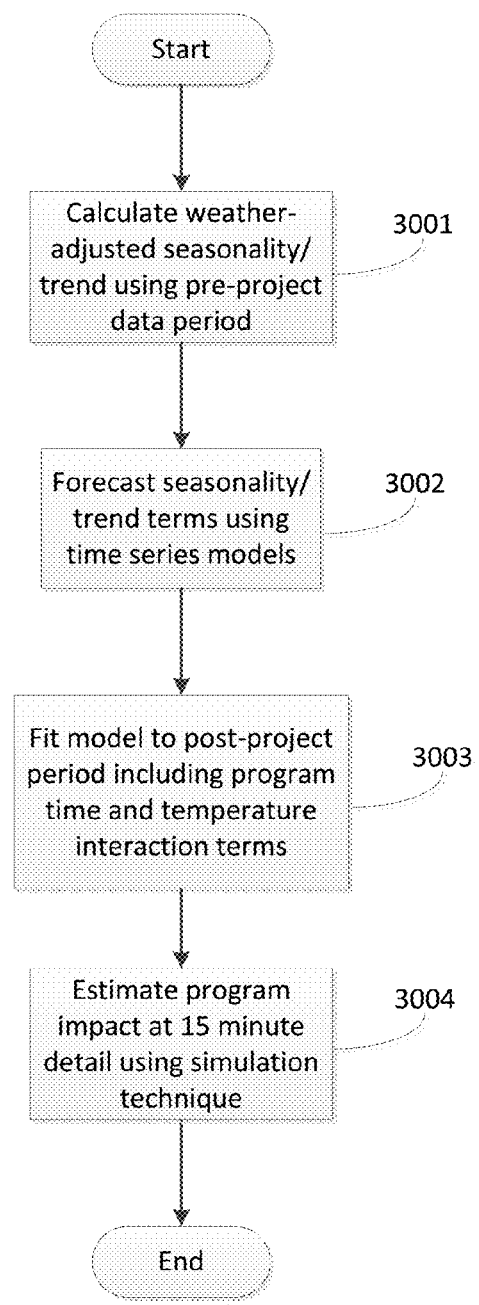
FIG. 30 is a process diagram depicting certain steps of the measurement and verification operation in certain embodiments.

Measurement and verification (M&V) is a technique for calculating savings from an energy efficiency project by creating a statistical model of pre-project building behavior. The model may then be used to forecast energy use into the post-project period, and the difference between the model's forecast and actual energy use is considered to be project-related savings. FIG. 30 depicts a process diagram depicting certain steps of the measurement and verification operation in certain embodiments. At step 3001 the system may calculate weather-adjusted seasonality/trend using pre-project data periods. At step 3002, the system may forecast seasonality/trend terms using time series models. At step 3003, the system may fit a model to post-project period data including program time and temperature interaction terms. At step 3004, the system may estimate the program impact at a granularity of 15-minute intervals using a simulation technique.

Various embodiments may model building energy use at the intra-day level, allowing not only for gross energy savings to be calculated, but also allowing for savings (and potential increases in energy use) to be characterized according to time of day or day of week, giving further insight into project efficacy. Various embodiments' models may decompose building energy use into baseload, weather-related, and time-related components, allowing efficiency gains to be ascribed to specific causes. For example, a lighting upgrade may be more likely to have a timing-related effect, and a chiller upgrade may be more likely to have a weather-related effect.

Various embodiments' models account for long-term trends in building energy use, and incorporate algorithms for automatically projecting those trends into the future. Trends have traditionally been confounding for M&V analysis, because they obscure (or exaggerate) the savings from the energy efficiency projects. For example, if a large tenant moves in shortly before an energy efficiency project is implemented, the overall increase in energy use may obscure savings from the project. Various embodiments' trend detection may automatically correct for these confounding effects by detecting trends and projecting them into the post-project period.

As certain embodiments automatically aggregate whole-building energy data and weather data, the system may allow for fully automated M&V with only a minimal number of user inputs. A project implementation date may be the only required input, although various embodiments may allow for input of occupancy changes, equipment changes (such as data center expansion), and trend forecasting.

Figure 31:
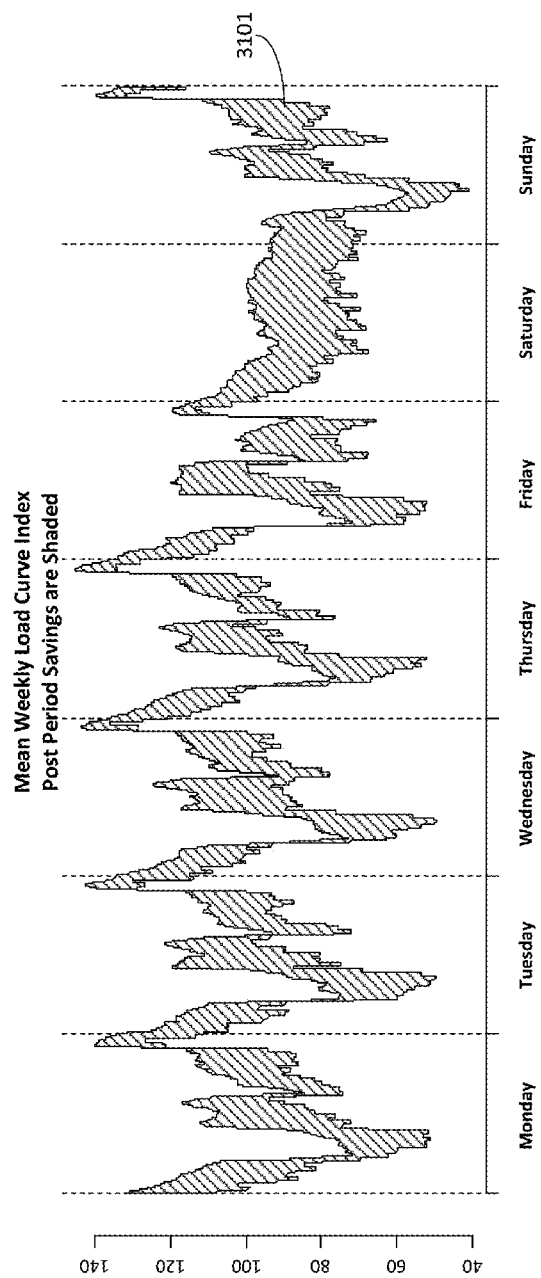
FIG. 31 is a plot of the mean weekly load curve index as may appear in certain embodiments.

Conventional regression model-based M&V analyses may report limited detail about the impact of the energy efficiency measure (EEM). In certain embodiments the system's M&V regression model may include day and time of day-specific EEM coefficients. This level of parameter detail may allow the system to compare simulated load values under simulation scenarios where the EEM is present and the base scenario where the EEM is not present at each day of week and time of day. The difference may represent the estimated EEM program effect, and may be quantified in tabular output or in a chart as in FIG. 31 to compare the EEM program savings with expectations based upon the nature of the changes. In FIG. 31 the difference is depicted by the region 3101.

In certain embodiments, the system's approach is to build a statistical model of both pre- and post-project energy use, compensating for factors such as temperature and other seasonal variation, as well as trends caused by changes in facility usage or other long-term factors. In certain embodiments, the modeling approach may use a modified version of the non-linear GAM temperature model described above to accurately capture the temperature response function of the building energy systems. By removing temperature effects from the pre- and post-project data, the system may better isolate changes in energy use due to the EEMs. Additionally, the system may characterize and project forward long-term trends using a similar approach to trend projection from our long-term budget forecasting method.

Using a weather- and occupancy-adjusted energy model, project savings may be calculated as the difference between the predicted energy consumption, assuming no EEMs were implemented, and the actual results over the study period. Annualized savings may be calculated via extrapolation or by adjusting the pre-period figures for typical weather conditions. The temperature-adjusted remainder may show substantial seasonality effects over the past three years. These long-term energy use trends may obscure the savings from EEMs. Like weather effects, these occupancy effects may be modeled directly using quantitative utilization data. Unfortunately, such information is often unavailable or incomplete.

An extension of the simulated load simulation technique may allow users to apportion the total estimated EEM effect to separate EEMs under certain circumstances. For example, consider an EEM project consisting of two sub-projects: 1) more efficient stairwell lighting and 2) more efficient HVAC system. The system may expect to see the lighting efficiency improvements as an overall decrease in demand throughout the evening hours; the improved HVAC system may likely reduce the steepness with which energy use increases with increasing temperature. In certain embodiments the system's M&V model represents schedule and weather-drive effects as separate sets of coefficients in the regression model, as described above regarding load decomposition. Constant (with respect to temperature) reductions in demand may be modeled via the inclusion of time-of-day program variables in the model. Reductions in temperature response may be modeled as an interaction term between temperature and program presence. Mathematically each time of day may have the following terms added to the model:

$$\text{program effect}=(\text{Lighting})+(\text{HVAC})\times\text{Temperature}$$

These terms may be set to zero during the pre-program period. The relative contributions of each sub-project may then be estimated via simulation, by setting one component to zero at a time and subtracting the estimated demand levels from the combined estimate when both components are included.

Remarks

While the computer-readable medium is shown in an embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding or carrying a set of instructions for execution by the computer and that cause the computer to perform any one or more of the methodologies of the presently disclosed technique and innovation.

The computer may be, but is not limited to, a server computer, a client computer, a personal computer (PC), a tablet PC, a laptop computer, a set-top box (STB), a personal digital assistant (PDA), a cellular telephone, a cellular telephone, such as an IPHONE®, or a tablet computer, such as an IPAD®, a processor, a telephone, a web appliance, a network router, switch or bridge, or any machine capable of executing a set of instructions (sequential or otherwise) that specify actions to be taken by that machine.

In general, the routines executed to implement the embodiments of the disclosure, may be implemented as part of an operating system or a specific application, component, program, object, module or sequence of instructions referred to as "programs," The programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, various embodiments are capable of being distributed as a program product in a variety of forms, and that the disclosure applies equally regardless of the particular type of computer-readable medium used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for the disclosure, are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teaching of the disclosure provided herein can be applied to other systems, not necessarily the system described above. The elements and acts of the various embodiments described above can be combined to provide further embodiments.

Any patents and applications and other references noted above are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limited the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A computer-implemented method comprising:
  collecting energy interval data associated with a building at a time interval, the energy interval data indicative of an energy use associated with the building;
  collecting local historical weather data associated with the building;
  creating a statistical model for predicting energy use as a function of weather and operational inputs, the statistical model created based on the energy interval data and upon the local historical weather data;
  analyzing paired energy interval data and local historical weather data according to one or more analytic algorithms, using the statistical model, the analyzing including decomposing the energy use into multiple categories, and analyzing each of the categories, wherein the analyzing includes:
    determining a peak to date energy use value that is indicative of a peak energy use associated with the building until a current time in a specified period,
    determining, for a forecasted period in the specified period, multiple demand values indicative of predicted energy demand, the demand values including a first set of predicted demand values whose peak probabilities are above their corresponding curtailment probabilities and a second set of predicted demand values whose peak probabilities are below their corresponding curtailment probabilities; and
  providing, for display at a computer associated with a user, one or more options to reduce energy bills of the building based on the analysis, the providing including providing the one or more options to reduce the energy bills by reducing the energy use in different categories, wherein the one or more options includes a target value that is indicative of a value to which energy demand in the forecasted period is to be curtailed and a particular period in the forecasted period when the energy demand is to be curtailed, the target value determined as a function of the peak-to-date energy use value, the first set of predicted demand values and the second set of predicted demand values.

2. The computer-implemented method of claim 1, further comprising collecting additional operational data, the additional operational data including at least one of occupancy, building hours, manufacturing output, and economic activity, and wherein the statistical model is created at least in part based on the additional operational data.

3. The computer-implemented method of claim 1, further comprising collecting energy financial data, the energy financial data including at least one of a tariff, historical bills, and historical bill cycle information.

4. The computer-implemented method of claim 1, wherein providing one or more options to reduce energy bills of the building comprises:
  determining that a portion of past or forecast energy use or demand exceeds a threshold or matches a predetermined pattern; and
  sending an automatic alert based on the data exceeding the threshold or matching the pattern.

5. The computer-implemented method of claim 1, further comprising analyzing interactions between use charges, demand charges, special incentive programs, rate options and time-of-use effects.

6. The computer-implemented method of claim 1, further comprising: generating one or more analysis reports based on at least the energy data and the analysis results.

7. The computer-implemented method of claim 6, wherein each of the one or more analysis reports includes a link to a web site with additional charts and analytic results.

8. The computer-implemented method of claim 1, further comprising: collecting weather forecast data of the building; and generating a forecasting report based on demand and use predictions of the building.

9. The computer-implemented method of claim 8, wherein the forecasting report includes an advanced warning when the period of highest energy demand of the building is likely to occur within current or future billing cycles.

10. A system for energy consumption and energy demand management, the system comprising:
  one or more processors in a cloud-based platform; and
  a computer readable device storing instructions which, when executed using said one or more processors, cause the cloud-based platform to perform operations comprising:
  collecting energy interval data of a building with a fixed time interval, the energy interval data indicative of an energy use associated with the building;
  collecting local historical weather data associated with the building;
  creating a statistical model of building energy use based on local weather;
  analyzing paired energy interval data and local historical weather data according to one or more analytic algorithms, the analyzing including decomposing the energy use into multiple categories by applying the statistical model, and analyzing each of the categories, wherein the analyzing includes:
    determining a peak-to-date energy use value that is indicative of a peak energy use associated with the building until a current time in a specified period,
    determining, for a forecasted period in the specified period, multiple demand values indicative of predicted energy demand, the demand values including a first set of predicted demand values whose peak probabilities are above their corresponding curtailment probabilities and a second set of predicted demand values whose curtailment probabilities are below their corresponding curtailment probabilities; and
  providing, for display at a computer associated with a user, one or more options to reduce energy bills of the building based on the analysis, the providing including providing the one or more options to reduce the energy bills by reducing the energy use in different categories, wherein the one or more options includes a target value that is indicative of a value to which energy demand in the forecasted period is to be curtailed and a particular period in the forecasted period when the energy demand is to be curtailed, the target value determined as a function of the peak-to-date energy use value, the first set of predicted demand values and the second set of predicted demand values.

11. A system as recited in claim 10, wherein the operations further comprise: collecting financial data of the building, the financial data including historical utility bills, utility rate structures and billing cycle dates.

12. A system as recited in claim 10, wherein the operations further comprise: analyzing interactions between use charges, demand charges, special incentive programs, rate options and time-of-use effects.

13. A system as recited in claim 10, wherein the operations further comprise: generating one or more analysis reports based on at least the energy data and the analysis results.

14. A system as recited in claim 13, wherein each of the one or more analysis reports includes a link to a web site with additional charts and analytic results.

15. A system as recited in claim 10, wherein the operations further comprise: collecting weather forecast data of the building; and generating a forecasting report on demand and use predictions of the building.

16. A system as recited in claim 15, wherein the forecasting report includes an advanced warning when the period of highest energy demand of the building is likely to occur in the current or future billing cycles.

17. A system as recited in claim 10, wherein the local historical weather data is collected with the fixed time interval.

18. A system as recited in claim 10, wherein the fixed time interval is a 15-minute interval.

19. A system for energy consumption and energy demand management comprising:
   a rate engine configured to simulate utility tariff logic;
   one or more processors in a cloud-based platform; and
   a computer readable device storing instructions which, when executed using said one or more processors, cause the system to perform operations comprising:
      collecting energy interval data of a building with a fixed time interval, the energy interval data indicative of an energy use associated with the building;
      collecting local historical weather data associated with the building;
      creating a statistical model of building energy use based on local weather;
      analyzing paired energy interval data and local historical weather data according to one or more analytic algorithms, the analyzing including decomposing the energy use into multiple categories by applying the statistical model, and analyzing each of the categories, wherein the analyzing includes:
      determining a peak-to-date energy use value that is indicative of a peak energy use associated with the building until a current time in a specified period,
      determining, for a forecasted period in the specified period, multiple demand values indicative of predicted energy demand, the demand values including a first set of predicted demand values whose peak probabilities are above their corresponding curtailment probabilities and a second set of predicted demand values whose peak probabilities are below their corresponding curtailment probabilities; and
      providing, for display at a computer associated with a user, one or more options to reduce energy bills of the building based on the analysis and based upon utility tariff logic generated by the rate engine, the providing including providing the one or more options to reduce the energy bills by reducing the energy use in different categories, wherein the one or more options includes a target value that is indicative of a value to which energy demand in the forecasted period is to be curtailed and a particular period in the forecasted period when the energy demand is to be curtailed, the target value determined as a function of the peak-to-date energy use value, the first set of predicted demand values and the second set of predicted demand values.

20. A system as recited in claim 19, wherein analyzing paired energy interval data and local historical weather data includes quantifying energy use patterns into a dollar amount in energy costs.

* * * * *